United States Patent [19]

Funyu et al.

[11] Patent Number: 4,491,731

[45] Date of Patent: Jan. 1, 1985

[54] TUBE WALL THICKNESS MEASUREMENT

[75] Inventors: Yutaka Funyu; Tadashi Okumura, both of Handa; Asao Monno; Masami Shimizu, both of Hino, all of Japan

[73] Assignees: Fuji Electric Co., Ltd.; Kawasaki Steel Corporation, both of Japan

[21] Appl. No.: 275,990

[22] Filed: Jun. 22, 1981

[30] Foreign Application Priority Data

Jun. 25, 1980 [JP] Japan .................................. 55-85214
Jul. 18, 1980 [JP] Japan .................................. 55-97579
Aug. 20, 1980 [JP] Japan .................................. 55-113529
Sep. 26, 1980 [JP] Japan .................................. 55-132987

[51] Int. Cl.$^3$ ............................................. G01N 23/00
[52] U.S. Cl. ............................... 250/358.1; 250/359.1; 378/59
[58] Field of Search ............... 250/358.1, 359.1, 360.1, 250/308; 378/58, 59, 68, 69

[56] References Cited

U.S. PATENT DOCUMENTS

| | | | |
|---|---|---|---|
| 2,975,281 | 3/1961 | Williams | 378/59 |
| 3,109,095 | 10/1963 | Van Horne | 378/59 |
| 4,038,550 | 7/1977 | Wassen et al. | |
| 4,187,425 | 2/1980 | Thompson | 378/59 |

Primary Examiner—Janice A. Howell

Attorney, Agent, or Firm—Brumbaugh, Graves, Donohue & Raymond

[57] ABSTRACT

An apparatus and method for measuring the thickness of a tube wall while the tube experiences motion relative to the apparatus is disclosed. The apparatus comprises means for generating a radiation beam and means for positioning the beam relative to a tube so that the beam sequentially passes along at least three selected beam paths. Each beam path passes through at least two distinct measuring points within the cross section of the tube wall. At least three measuring points are passed through by at least two different radiation beams. Beam intensity detection means are provided for detecting the intensity of the transmitted beam after it passes through the tube wall, and produces a detected value of the intensity, which is supplied to a processing means which determines the tube wall thickness based upon the detected value after it transmitted through the tube and the known intensity value of the beam before it is transmitted through the tube. The invention is also directed to a means for preventing radial deflections of a tube during measuring comprising pairs of rollers, means for pressing the rollers to the tube and control means for regulating the pressing force that the pressing means exerts on the tube.

16 Claims, 50 Drawing Figures

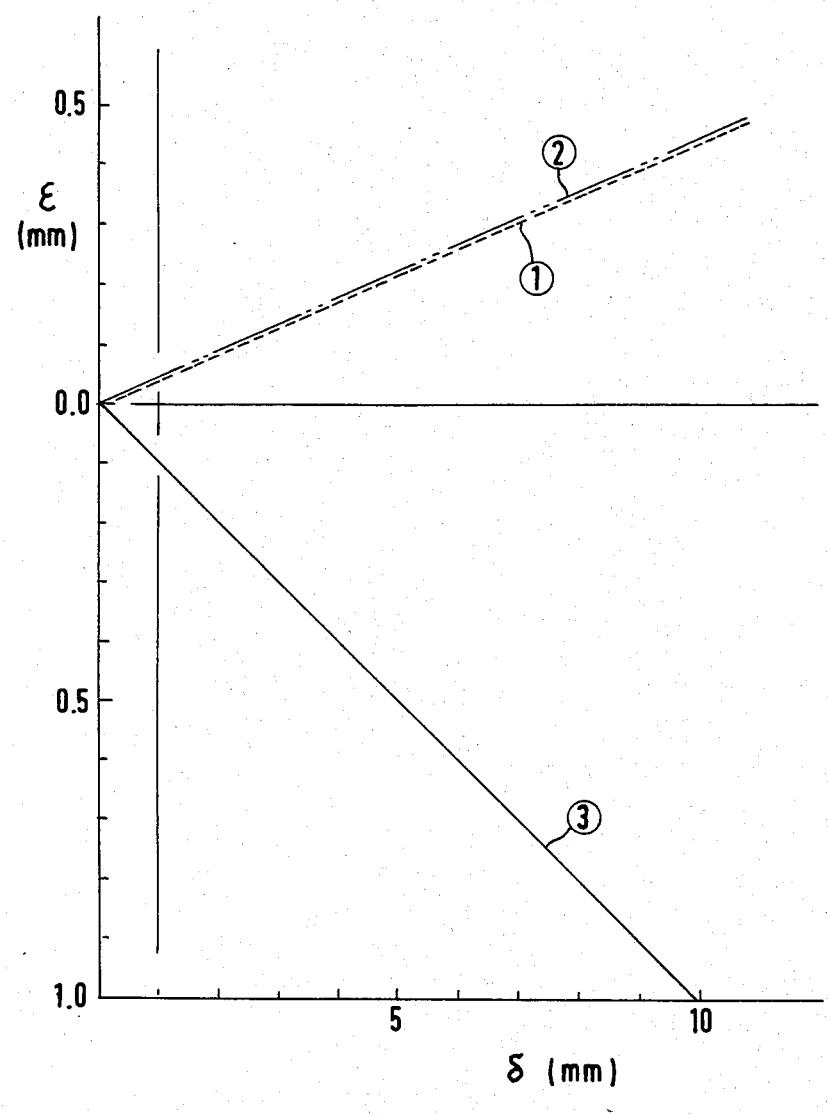

MEASURING DEVICE

TUBE DETECTORS

TUBE WALL THICKNESS MEASUREMENT

TECHNICAL FIELD

This invention relates to an apparatus and method for measuring the wall thickness in tubes and like structures or objects.

BACKGROUND OF THE INVENTION

In manufacturing tubing such as seamless steel tubes, it is necessary to accurately measure and gauge the wall thicknesses at several points on the periphery of a tubular object, in a non-contacting manner. One such apparatus and method is disclosed in U.S. patent application Ser. No. 190,800, filed Sept. 25, 1980, now U.S. Pat. No. 4,393,305, entitled "A Method and Apparatus for Measuring Tube Wall Thickness", said application being assigned to the assignee of the present application. The method and apparatus disclosed in the latter referenced patent application, while novel, still have disadvantages, wherein improvements are possible.

Firstly, the prior method and apparatus is not as compact in arrangement of the measuring equipment as may be preferable in some cases. The prior apparatus includes plural sets of the measuring instruments with each set comprising a radiation source and a detector, and specifically the number of instrument sets required is at least equal to the number of the measuring points (c.f. the description in the former application), since the same number of radiation beams must be produced to pass through those measuring points.

In general, instruments using radioactive rays should be provided with a shield of a relatively large thickness of about 5 or 10 cm. When using X-rays, the required radiation source is usually at least as massive as a source for radioactie rays. In the former apparatus and method, plural sets of such instruments including the radiation sources with containers (or the shields) are required to be arranged within a rather narrow circular zone around the tube to be examined. Consequently, when many measuring points are used, the equipment of the former invention may be quite complex in arrangement of the instruments, with the result that difficulty may be experienced in assembly or maintenance, particularly when the equipment is used in on-line applications.

Secondly, the former invention is not well suited to applications where one desires to frequently change the diameter of the tubes to be measured. In those cases, the plural measuring instruments which are stationarily mounted around a tube have to be removed and repositioned when the diameter of one or more tubes to be measured is changed.

For example, in FIG. 1 there is illustrated in solid lines a measuring equipment arrangement having seven radiation beams (i.e. seven measuring points) around a tube 20S which has a relatively small diameter. Each measuring equipment set comprises a radiation source container 2 and radiation detector 4. When the tube to be measured is changed to another tube 20L which has a relatively larger diameter as shown by broken lines, the seven measuring points (i.e. points of intersection of the lines) move outwards. Therefore the seven sets of measuring instruments have to change their positions in a manner which is typically shown by broken lines for two of the seven. Changing the positions of those instruments is not particularly easy. Further, it may eventually cause the instruments to butt against each other in part, as shown by reference character Z in FIG. 1. In order to avoid having to reposition these instruments, it is necessary to have a sufficient distance between the radiation source 2 and detector 4 of each set of the measuring instrument. This results in a large space being required for equipment, with a corresponding increase in capacity for the radiation source, and consequently a larger shield for the source.

Thirdly, the former invention is directed to a case where a value k, equal to an actual transit path length S of radiation beam across a tube wall through a measuring point, divided by the wall thickness x at that point, is not adequately approximated, not easily determined nor given beforehand. If the expected range of variation, or the unevenness of outer and inner surfaces of a measured tube are small, then no particular problem arises at obtaining an accurate k value. However, there may be other cases where the value $k = S/x$ is either not given beforehand, nor easily determined, nor obtainable by any adequate approximation. Accordingly, a solution to the problem of obtaining an accurate k value would be desirable.

Referring to FIG. 2, a value of k, or the relation between a radiation beam transit path length and tube wall thickness, could be obtained by using the following equations:

$$\xi = \sqrt{R_1^2 - h^2} - \sqrt{R_2^2 - h^2} \tag{1}$$

$$= \sqrt{R_1^2 - (R_o \sin\theta)^2} - \sqrt{R_2^2 - (R_o \sin\theta)^2} \tag{2}$$

$$= \sqrt{R_1^2 - (R_o \sin\theta)^2} - \sqrt{(R_1 - x)^2 - (R_o \sin\theta)^2} \tag{3}$$

wherein x is the radial thickness in a direction of a radial line OA passing through the center of the tube section and a measuring point B, l is a line representing a radiation beam, $\xi$ is an oblique thickness of the tube wall along the line l (i.e. the length of the segment of the line 1, whose endpoints are defined by the outer and inner surfaces of the tube), $R_1$ and $R_2$ are outer and inner radii respectively of the tube, $R_0$ is a radius of a circle passing through the measuring point B and with its center at the center 0 of the tube section, and h is a height of the perpendicular from the center 0 to the line 1. The values of O and $R_0$ are known. A value of $\xi$ can be determined, provided that both $R_1$ and $R_2$ are known, in Eq. (2), or provided that both $R_1$ and x are known, in Eq. (3). In the case where the unevennesses of both the outer and inner surfaces of a tube are neglible, the value of k, i.e. the ratio of $\xi$ to x can be obtained. But otherwise, it generally cannot be obtained.

Fourth, preventing the radial deflection of a tube can further improve the accuracy of measurement in the prior art apparatus and method. If a tube is motionless when it is being measured, no significant problem may result. However, if a tube is running at a high speed, for example, during an actual process of manufacturing seamless steel pipes, and particularly where an on-line measurement is required, any radial deflection or vibration may cause deflections of relative positions of radiation beams and measuring points to the tube, resulting in errors in measurement which are no longer negligible.

Radial deflection of a tube may be caused, for example, by a kind of random shifting of feed line of the tube, by a bend of the tube, or by distortion of the tube from a genuine circular shape.

It may be possible to detect horizontal and vertical deflections of the axis of a running tube by photoelectrical or flying image sensor means, for example, and to dynamically shift the position of the measuring equipment so as to follow the deflecting tube position. However, this requires a costly device. Also, it may be possible to make corrections of measured results according to the detected tube axis deflection. However, this still requires a costly device or a complicated program of computer. FIG. 3 shows an example of the relation between the one-directional tube axis deflection δ (abscissa, in mm) and the corresponding correction necessary in the measured output. It is ε obtained by computer simulation, assuming that the tube outer diameter is 300 mm, its wall thickness 9.93 mm, and the radiation beam thickness 10 mm, and their arrangement and the tube deflection direction are as shown in FIG. 4, where MP1 through MP3 denote measuring points, and δ denotes the deflection. In FIG. 3, lines 1, 2 and 3 indicate corrections required at the points MP1, MP2 and MP3, respectively. The required accuracy for measuring wall thickness of a tube is normally about 0.1 mm. However, considering that deflection of the tube axis can occur further in modes other than that shown in FIGS. 3 and 4, adequate correction for deflection is impractical. Therefore, some other means of improvement are desirable.

SUMMARY OF THE INVENTION

The present invention is intended to overcome the above-mentioned problems in the prior art apparatus and method.

In a first feature of the present invention, one of the improvements over the prior art is obtained by utilizing the relative motion of the tube body and the measuring equipment with respect to each other. By using only a single set of measuring instruments, one can obtain plural sets of data on radiation beam intensity by detecting and measuring the beam at certain time intervals over the time that the tube body and measuring equipment experience relative motion, with the data including information about the speed and the mode of the relative motion. Thus, by measuring the wall thickness at a certain position on the tube in the above manner, one achieves the same effect as if the measurement data was obtained simultaneously from a plurality of measuring instruments all arranged within a narrow circular zone around the tube body. The relative motion may be either continuous or stepwise. Also, the number of sets of measuring instruments may be only one, or more than one. Even if two sets of measuring instruments are employed, this is still less than the prior art, where at least three sets are used.

More specifically, as will become apparent from a description of the first embodiment of the present invention, the direction of relative motion of the tube with respect to the measuring equipment may be in a direction which is parallel to the axis of the tube. For a tubular product such as a seamless steel pipe, it is quite common for the pipe to be transported in this direction. Therefore, measurements can be made as the pipe is running in its axial direction in a continuous mode. In this mode of relative motion, the measuring instruments may be placed at position along the direction of the tube axis. Alternatively, when the tubular product to be measured is not being transported axially; relative axial motion of the tube and instruments may be accomplished by having an assembly of the measuring instruments travel (either stepwise of continuously) in the axial direction by means of a drive mechanism.

Also, as will become more apparent in the description of the second embodiment of the present invention, the relative motion of the tube and the measuring equipment may be rotational instead of axial. In most phases of transporting the tube for example, the tube does not rotate, so that in this mode of measuring the measuring equipment revolves around the tube. Alternatively, one may keep the equipment stationary and instead rotate the tube. Since the mode of the motion of a rotating tube is in most actual cases continuous as opposed to stepwise, the measuring equipment can be provided with an appropriate drive mechanism which can produce various modes of relative motion, which may be either continuous or stepwise, whether the tube is rotating continuously or not at all.

A second feature of the present invention is directed to determining wall thickness using arithmetical operations which do not involve the value k, where k=S/x and where S is the radiation beam transit path length, and x is the wall thickness in a radial direction of the tube.

This is accomplished by having arithmetical operations which determine the lengths of radiation beam transit paths across the tube wall i.e. which determine a kind of oblique thickness of the tube wall measured along the radiation beam directions, and by having a measuring equipment arrangement wherein the measuring points are positioned so that the points are the vertices defining an equilateral polygon having an odd number of sides, and so that the number of polygon sides on one side of each beam path is equal for all positions of said beam path throughout said measuring operation.

The above arrangement is based on a concept that the wall thickness along a radial line passing through a measuring point is generally proportional to an average of the lengths of two radiation beam transit paths passing through the measuring point, provided that the angle between one of the paths and the radial line, and the angle between the other of the paths and the line are both identical with each other and maintained at a predetermined constant angle value. The above condition on the angles can be satisified if all of the measuring points are disposed to form an equilateral polygon as described above, and if the center point of the polygon coincides with a center point of radial directions in which the radial thicknesses of the tube wall should be defined. Of course, all of the vertices of the polygon should be within the cross-section of the tube wall to be examined.

Also, the shape of the tube section, the definition of the tube section and its center, as well as the definition of the wall thickness of a tube which has some unevenness of surface should be understood according to the following.

With respect to the shape of the tube section to which the invention is to be applied, the section will generally be a circular one, but it may also be an equilateral polygon. (In this context, a circle may be considered to be an equilateral polygon having an infinite number of sides.)

With respect to the transversal tube section or measured section, it should be a tube section contained in a plane which contains all the measuring points or all the radiation beam axes at every position of each of them. Generally, the measured section will be substantially perpendicular to axis of the tube, but this is not necessarily the case. When the measured section is within a bend portion of a tube, the measured section should preferably be selected so that its shape is as genuinely circular (or genuinely of an equilateral polygon) as possible. Generally, the tube to which the invention is applicable is substantially circular (or of equilateral polygon) in its overall sectional shape as well.

Specifically, referring to FIG. 5, which shows a measured section of a tube having an outside OLO and an inside OLI both uneven to some extent, it is required that the configuration of the measured section should be so circular that at least one complete circle ILC can be generated within the measured section without any significant break in the circle. (In the case of a polygonal measured section, a similar requirement should exist.) In contrast, the tube section as shown in FIG. 6 is distorted and therefore is not an appropriate object which the invention can measure. To put the requirement another way, in order for the invention to measure a particular object, the section of the object must be such that, by using polar coordinates $R=r(\theta)$, with its origin at some point 0 on the plane of the measured section, a function to represent the curve, outside or inside of the section, must not be multivalent in some portion of the section. Since the object shown in FIG. 6 does not meet this condition, this object cannot be measured with the invention. In FIG. 6, the r-coordinate of the outside of the tube section is bivalent, i.e. has two values of distances between 0 and a point OPO-1 and between 0 and another point OPO-2, at $\theta=\theta_1$ for example. However, a quasitubular object, such that shown in FIG. 7 for example, having a narrow partial break BSN in its sectional configuration, and a tubular object as shown in FIG. 8, having small projections PPR or small depressions PDP on its periphery, are objects to which the invention can be employed.

Some tube sections may be too distorted in shape to be measured. A test for distortion is made with reference to the center of the tube section. The center is a center point of radial directions in which the radial thicknesses of tube wall should be defined. Such a center point may be defined in any appropriate manner. For example, the center point may be defined either to be the center of mass of the section or to be an intersection of two substantial diametrical lines (e.g. DCL-1 and DCL-2 in FIG. 9), each of which is a center line equidistant between the pair of parallel tangential lines (e.g. radiation beam lines) contacting with the outside of the tube and which lie in known, but arbitrarily determined directions, different from each other. Where the mechanical structure to support or feed the tube body, substantially avoiding a radial displacement of position of the tube, gives a certain contour through which the tube passes, the center of that tube section may be defined as the center of such a contour. In short, any method of defining the center point will suffice, as long as it is not changed during a measurement process. (Changing the definition of the center point will cause different measurement results from the same object to be measured.)

After the center position of the tube has been defined, a wall thickness of the tube having some uneven surface can be defined with respect to the center. (See FIG. 10) The thickness of a tube wall at a measuring point MP1 is defined as a wall thickness $X_1$ appearing along a straight line passing through both the measuring point MP1 and the previously defined center 0. The measuring point MP1 is a point in a measured section which is within a portion the wall thickness of the wall being measured. At least two radiation beams 3A and 3B pass through the measuring point MP1. Practically, a wall thickness $X_1$ can be represented by a quantity which is proportional to an average of oblique thicknesses of the tube wall in the above sense. Such a wall thickness may be an average thickness within the portion covered by both segments $W_1$ and $W_2$, of outside and inside contours, respectively. The segments $W_1$ and $W_2$ are defined by the intersection of the two radiation beams 3A and 3B with the measured section. The wall thickness is the average distance between segments $W_1$ and $W_2$ based upon an allowable assumption that each of those intercepted contours is a part of the circle. Further, it may be assumed that the tube wall has a thickness equal to that average thickness everywhere within that measured section, as if the two contours are concentric.

A third feature of the present invention is directed to the prevention of radial deflections of a tube being measured, and to an apparatus and method for obtaining a higher degree of accuracy of the measurement.

This is obtained, in the present invention, by providing supporting means for steadying the tube surface. The means comprises pairs of rollers and means for pressing the roller pairs to hold the tube body, control means for regulating the pressing force that the pressing means exerts on the tube, and driving means for rotating the rollers so as to run the tube in its longitudinal direction.

Numerous other advantages and features of the present invention will become more readily apparent from the following detailed description of the invention, and embodiments thereof, from the claims and from the accompanying drawings.

BRIEF DESCRIPTION OF THE DRAWINGS

FIG. 3 is a graph showing the required correction of measurement in case of an examined tube having radial deflections which sometimes occur;

DETAILED DESCRIPTION OF THE PREFERRED EMBODIMENTS

Figure 11:
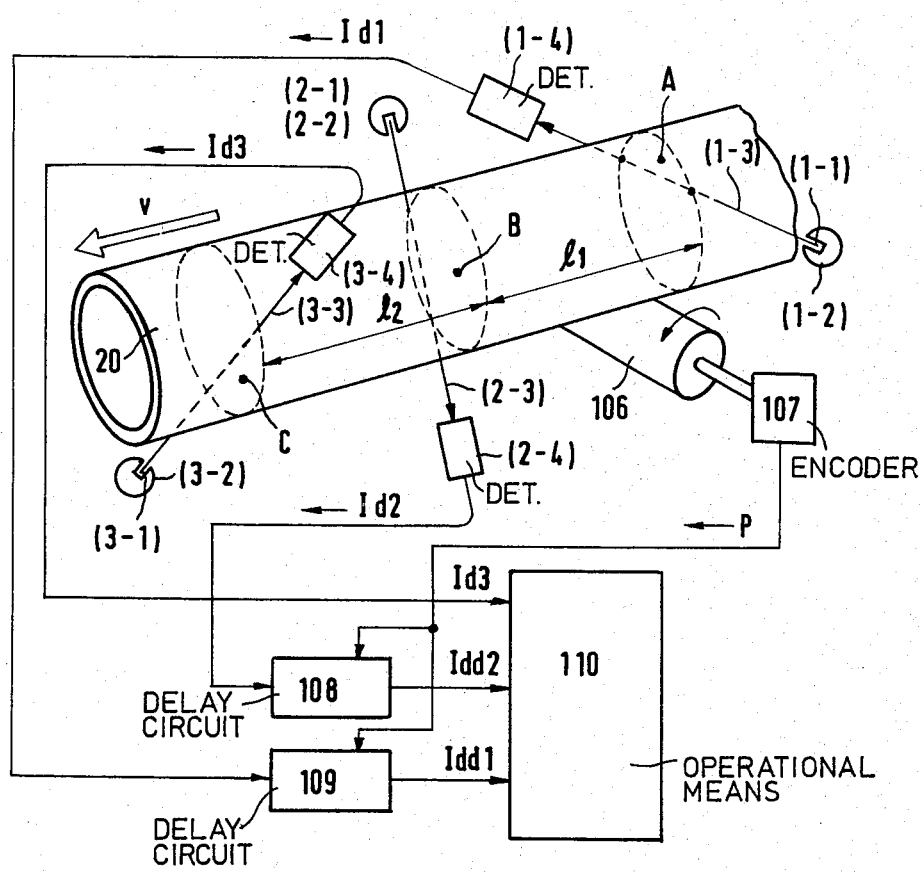
FIG. 11 is a schematic illustration of arrangement of the measuring instruments and an associated operation circuit, of a first embodiment of the present invention.
Figure 12:
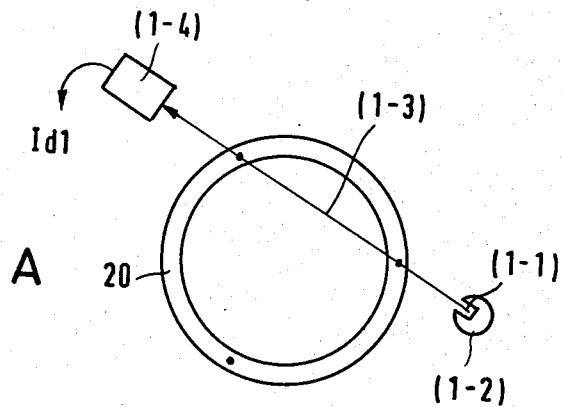
FIG. 12 shows three transversal sections A, B and C of a tube of FIG. 11, with respective radiation beams also shown.

FIG. 11 is a schematic illustration of arrangement of the measuring instruments with an associated operation circuit, showing a first embodiment of the invention. In the embodiment, the motion of the tube with respect to the measuring instruments is in a longitudinal direction, and the number of the radiation beams is three, i.e. the equipment comprises three sets of the instruments, each set including a radiation source and a radiation detector.

Figure 13:
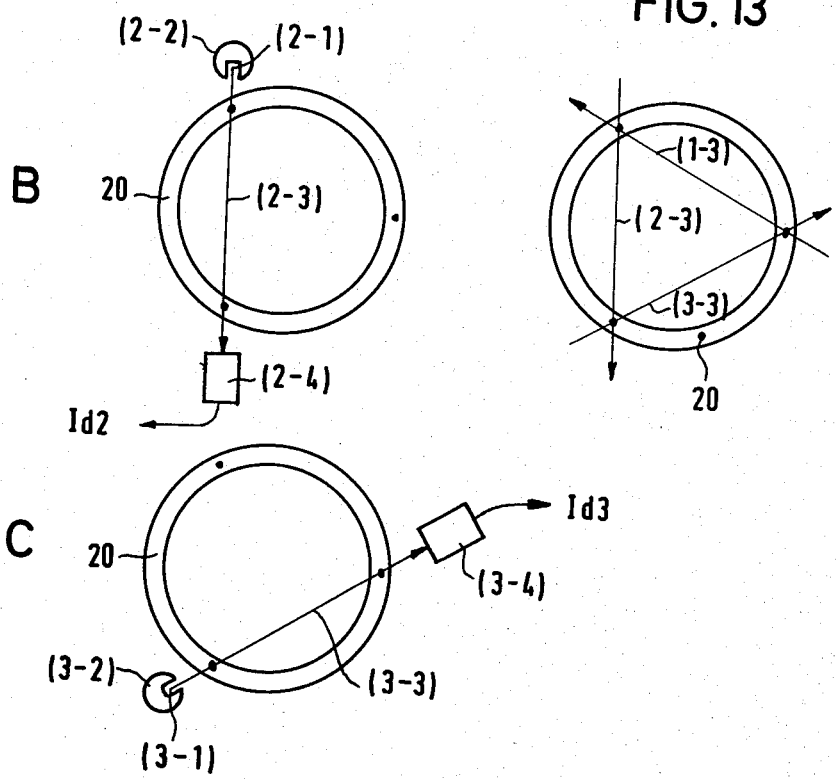
FIG. 13 shows the formation given by the three radiation beams of FIG. 11, as viewed in a longitudinal direction of the tube.

In FIG. 11, reference characters (1-1), (1-2), (1-3) and (1-4) denote, respectively, a radiation source, its container, a radiation beam and a detector for a first radiation beam system, while (2-1), (2-2), (2-3), (2-4) and (3-1), (3-2), (3-3), (3-4) denote the same items for second and third radiation beam systems, respectively. Numeral 20 denotes a tube to be measured. It is assumed that the tube 20 is running at a velocity v in the direction of the large arrow, but is not rotating. The measuring instruments are disposed so that planes containing the respective radiation beam axes are at distances $l_1$ (between the first and the second and $l_2$ (between the second and the third) in the direction of the tube axis. The radiation beams lie on the respective transversal sections A, B and C of the tube as shown in FIG. 13 when they are viewed together in the tube axis direction. The formation of FIG. 13 appears quite similar to that of radiation beams in FIG. 3 of the former application referenced above. With the longitudinally dispersed arangement, the measuring instruments in the present invention are easily mounted around the tube and easily maintained.

The measuring instruments arranged as in FIG. 11 produce respective outputs $I_{d1}$, $I_{d2}$ and $I_{d3}$ from the detectors (1-4), (2-4) and (3-4). These outputs will slightly vary as the equipment shifts its position with respect to the tube body. (The detectors may be either digital or analog, and the outputs thereof, may be either instantaneous or or quantized.) These detector outputs represent intensities of the radiation beam transmitted across the tube body along the different sections A, B, and C, respectively, and not along a single section. Therefore, the equipment is provided with means to derive from the detector outputs an assorted set of values of radiation beam intensities adapted for calculation of a tube wall thickness. The means to derive the set of values as shown in FIG. 11 comprises a relative tube motion pickup 106, which may be for example a shaft of a drive roll to feed the tube 20 in the direction of the arrow v (in the drawing), or may be an idler which is rotated in contact with the tube surface without slip, to detect either the tube velocity v or the longitudinal length of the tube which passes by the pickup within a unit time duration. The means also comprises an encoder 107 coupled with the pickup 106 which produces a digital output P proportional to the tube velocity v. More specifically, the digital output P may be a pulse train containing a number of pulses per a unit time which is proportional to the tube velocity detected by the pickup 106. The means further comprises first and second delay circuits 109 and 108 connected to receive the outputs $I_{d1}$ and $I_{d2}$ of the two radiation detectors (1-4) and (2-4), respectively, in the case of the equipment arranged as shown in FIG. 11, and also connected to receive the encoder output P, and connected to a main operational means 110.

The first delay circuit 109 produces an output $I_{dd1}$ which is identical with the radiation detector output $I_{d1}$ of the first radiation beam system, but which is delayed by a duration $t=(l_1+l_2)/v$, where $l_1$ is a distance in the tube axis direction between the transversal sections A and B, and $l_2$ is another distance in the same direction between the same B and C, while v is the tube velocity in the same direction as mentioned. The second delay circuit 108 produces an output $I_{dd2}$ which is identical with the radiation detector output $I_{d2}$ of the second radiation beam system, but which is delayed by a duration $T=l_2/v$. The main operational means 110 is connected to receive the delayed outputs $I_{dd1}$ and $I_{dd2}$, and also connected to receive the non-delayed output $I_{d3}$ of the radiation detector of the third radiation beam system.

Thus the inputs to the main operational means 110 are outputs $I_{dd1}$, $I_{dd2}$ and $I_{d3}$, representing the assorted set of values of radiation beam intensities obtained in a single transversal section of the tube which is in relative motion.

The method of calculating the tube wall thickness using those inputs may be quite similar as mentioned in the above reference patent application, and therefore, a description thereof is omited here. Although the above embodiment is described and shown using three radiation beam systems, the number of beam systems is not limited in three, and various modifications are possible.

Figure 14:
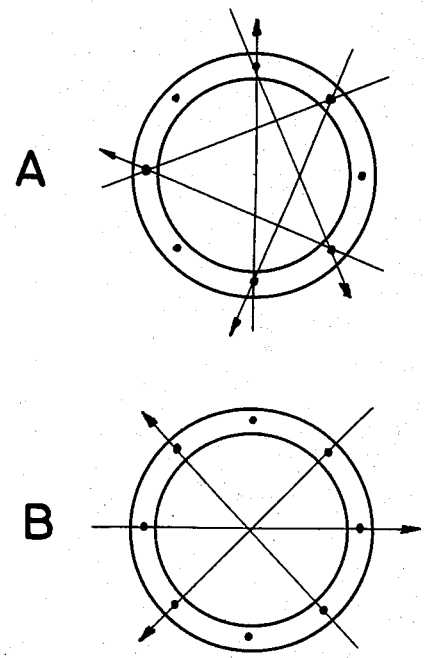
FIG. 14 shows two transversal sections, A and B, of a tube being measured, with five and three radiation beams, respectively, of the two sections A and B.
Figure 15:
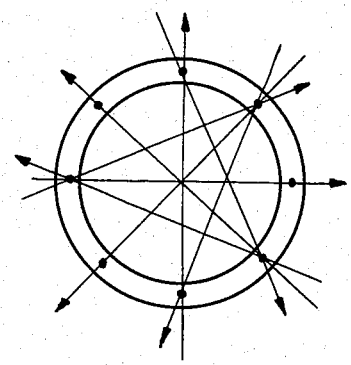
FIG. 15 shows the formation given by the eight radiation beams of FIG. 15, as viewed longitudinally to the tube.

For example, a modification of the first embodiment can be realized by using a radiation beam arrangement as shown in FIG. 14, involving eight measuring points with eight radiation beam systems which are arranged in two transversal sections A and B of the tube. FIG. 14, part A, shows the section A, in which five of the beams lie, while part B shows the other section B, in which the remaining 3 of the beams lie. Their combination results in a formation shown in FIG. 15 when they are viewed together in the direction of the tube axis. Delay circuits are used to delay the radiation detector outputs of radiation beam systems arranged on upstream-side one of the two sections A and B, by a time duration $t=l/v$, where l is a distance in the tube axis direction between the sections A and B. Other delay systems are used similarly.

Figure 16:
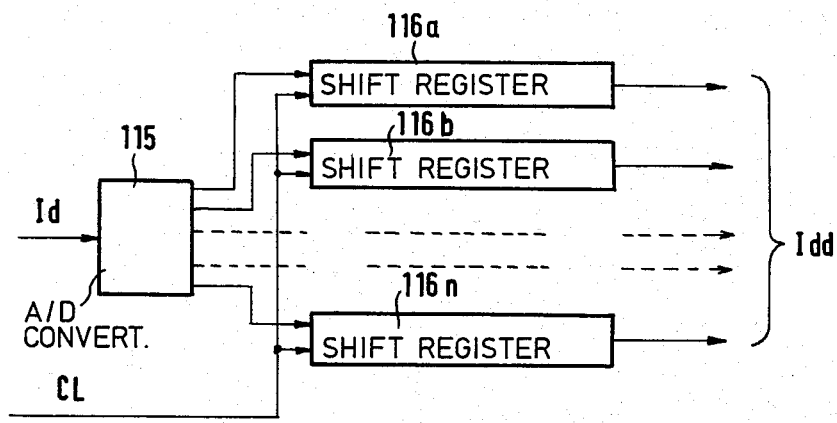
FIG. 16 shows an example of a delay circuit which can be used in FIG. 11.

FIG. 16 shows an example of a configuration of a particular delay circuit which may be used in the embodiment of the invention just described. Reference character $I_d$ denotes one of the radiation detector outputs to be delayed. It is assumed that these output signals are analog. The signal $I_d$ is transformed by an A/D converter 115 into a digital variable having a plurality of (q) bits. Plural shift registers 116a, 116b ..., 116n are connected to the outputs of the A/D converter 115. The number of sets of the shift registers is equal to the number q of bits of that digital variable produced at the output of the A/D converter 115. (If binary coded decimal representation is used and the calculation requires the precision corresponding to R decimal figures at the A/D converter output, then the output should have 4R bits in binary code. In this case q=4R. Then 4R sets of serial shift registers 116a, 116b, ..., 116n are connected to the outputs of the A/D converter 115.)

Each of the shift registers are also connected to receive shift pulses C1 from the output P of the encoder 107. The output P is a pulse train with the number of pulses contained in the train appearing in a unit duration proportional to the tube velocity v detected by the pickup 106. The number of bits provided in each shift register should be determined with reference to the required resolution in the delay time, and may be proportional to a maximum allowable deviation of the quantity of $v \times t$ (i.e. the product of the tube velocity and the delay time) from the actual distance l in the tube axis direction between the two transversal sections involving the radiation beam systems concerned. The pulse interval of the shift pulses CL should be determined by the number m of bits (i.e. binary cells) of the shift register, and the expected value of the tube velocity v. Specifically, it should be determined so that the number of the shift pulses CL produced during the time interval that the tube runs axially along a length l equal to the distance between the two related transversal sections (sections A and C for the first delay circuit, and sections B and C for the second delay circuit) is equal to the number m of bits of the shift register. If it is desired that the resolution in the delay time should be not more than a time duration resulting in the tube traveling a distance $\Delta l$ in its axial direction, then the number of bits m of the shift register is such that $m \geq l/\Delta l$ where l denotes the distance specified above. For the second delay circuit 108 of that embodiment as shown in FIG. 11 the number m is given by $$m = \frac{l_2}{\pi D_R} \cdot n \geq \frac{l_2}{\Delta l}$$

where $D_R$ denotes a diameter of a roller member of pickup 106 contacting with the tube surface, and n denotes the number of pulses generated by the encoder 107 for one complete revolution of the roller member. For the first delay circuit 109 as shown in FIG. 11, the number m is given by $$m = \frac{l_1 + l_2}{\pi D_R} \cdot n \frac{l_1 + l_2}{\Delta l}$$

The output of the A/D converter 115 may be a set of signals (the number of which is q) produced substantially simultaneously which are outputed to respective lines connected to input terminals of the respective shift registers 116a, 116b, ..., 116n. Each of the shift registers 116 has an input means inserted between its signal input terminal and its first binary cell, to lead an input signal from the signal input terminal to the first binary cell only when a shift pulse CL has been supplied. Thus a single set of 1-bit data of the converter output is stored in a combination of first binary cells (input-side cells) of the shift registers. Whenever a further shift pulse CL arrives, the single set of q-bit data is shifted by one step in the shift registers. Since the pulse interval of the shift pulses CL is determined with respect to the number m of bits of the shift register (and also to the tube velocity v), the single set of 1-bit data will be fully shifted by m steps of binary cells in the shift registers, and appear at the output side of the shift registers, when the tube has run by a length equal to the distance between said two related transversal sections, which length is $l_1+l_2$ for the first delay circuit 109 is $l_2$ for the second delay circuit 108 in FIG. 11. Thus, these circuits 109 and 108 delay their inputs (i.e. $I_{d1}$ and $I_{d2}$) by durations $$t_1 = \frac{l_1 + l_2}{v} \text{ and } t_2 = \frac{l_2}{v}$$

respectively. $I_{dd}$ in FIG. 16 denotes the delayed output $I_{dd1}$ or $I_{dd2}$, which is a q-bit signal in binary code, to be supplied to the main operational means 110. The other output $I_{d3}$, when it is analog, is supplied through an A/D converter to that means 110. (This converter is not shown. It can be provided separately, or may be deemed to be included in the means 110).

Figure 17:
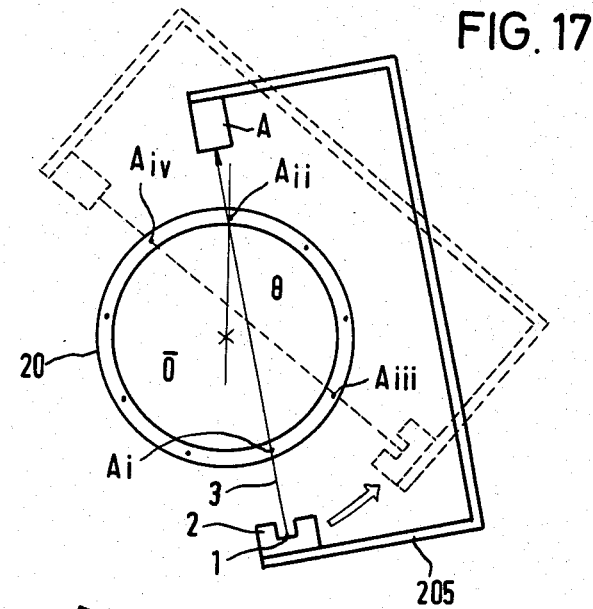
FIG. 17 is a schematic illustration of measuring equipment, showing an example of a second embodiment of the invention, with a single revolving radiation beam.

FIG. 17 is a schematic illustration of a second embodiment of the invention which utilizes a relative revolving motion of the measuring instrument around the tube. There a radiation source container 2 with a source 1 and a radiation detector 4 are mounted on a frame 205, which is mounted to a supporting mechanism (not shown) so as to revolve around the tube 20. A point 0 shows the center axis of rotation of the radiation beam system comprising the source 1, a radiation beam 3 and the detector 4, with the container 2 and frame 205. This center axis 0 should coincide with the central axis of the tube 20. Then, an angle $\theta$ between (1) the radiation beam, and (2) a line connecting the center of a circle enveloping the measuring points to an intersection of this circle and the radiation beam can be maintained constant at every position of the revolving radiation beam. Points $A_i$ and $A_{ii}$ or $A_{iii}$ and $A_{iv}$ are pairs of such measuring points passed by the radiation beam.

Figure 20:
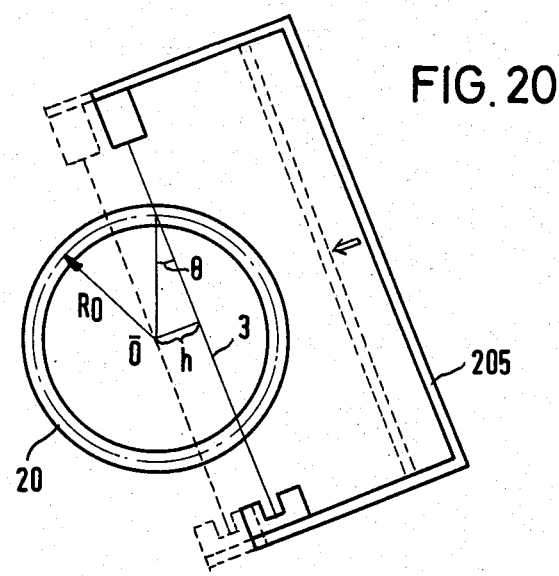

Preferably, the supporting mechanism to which the frame is mounted should be able to move the frame also in a transversal direction substantially perpendicular to both the radiation beam and tube axis. (This will be described later in conjunction with FIG. 20. That is in the case where it is required to change the angle $\theta$.)

The revolving motion of the radiation beam system may be either stepwise or continuous. Suppose the revolving motion takes place stepwise. When the frame 205 is motionless at a first position shown by solid lines in FIG. 17, with the radiation beam 3 passing through the points $A_i$ and $A_{ii}$, the radiation detector 4 produces a first output indicating the intensity of the transmitted radiation beam in that condition. When the measuring instrument frame 205 is revolved around the center 0, and stopped at a second position shown by broken line in FIG. 17, the radiation beam passes through the other two points $A_{iii}$ and $A_{iv}$. The detector 4 then produces a second output indicating the intensity of the transmitted radiation beam in this condition. Similar events take place successively, to procure a set of those detector outputs for all the measuring points, which are circularly arranged. Turning the radiation beam direction nine times by angle each of 40° gives a nine measuring point measurement which is similar to the prior art above referenced application, but in the prior art, nine separate sets of measuring devices are needed. Thus a single moving radiation beam system serves the same similar measurement function as a plural stationary beam system arranged around the tube. (The above applies to the cases having any numbers of measuring points and where no change of the angle is required, as shown in FIGS. 3 through 6 of the above referenced patent application, for example.)

Figure 1:
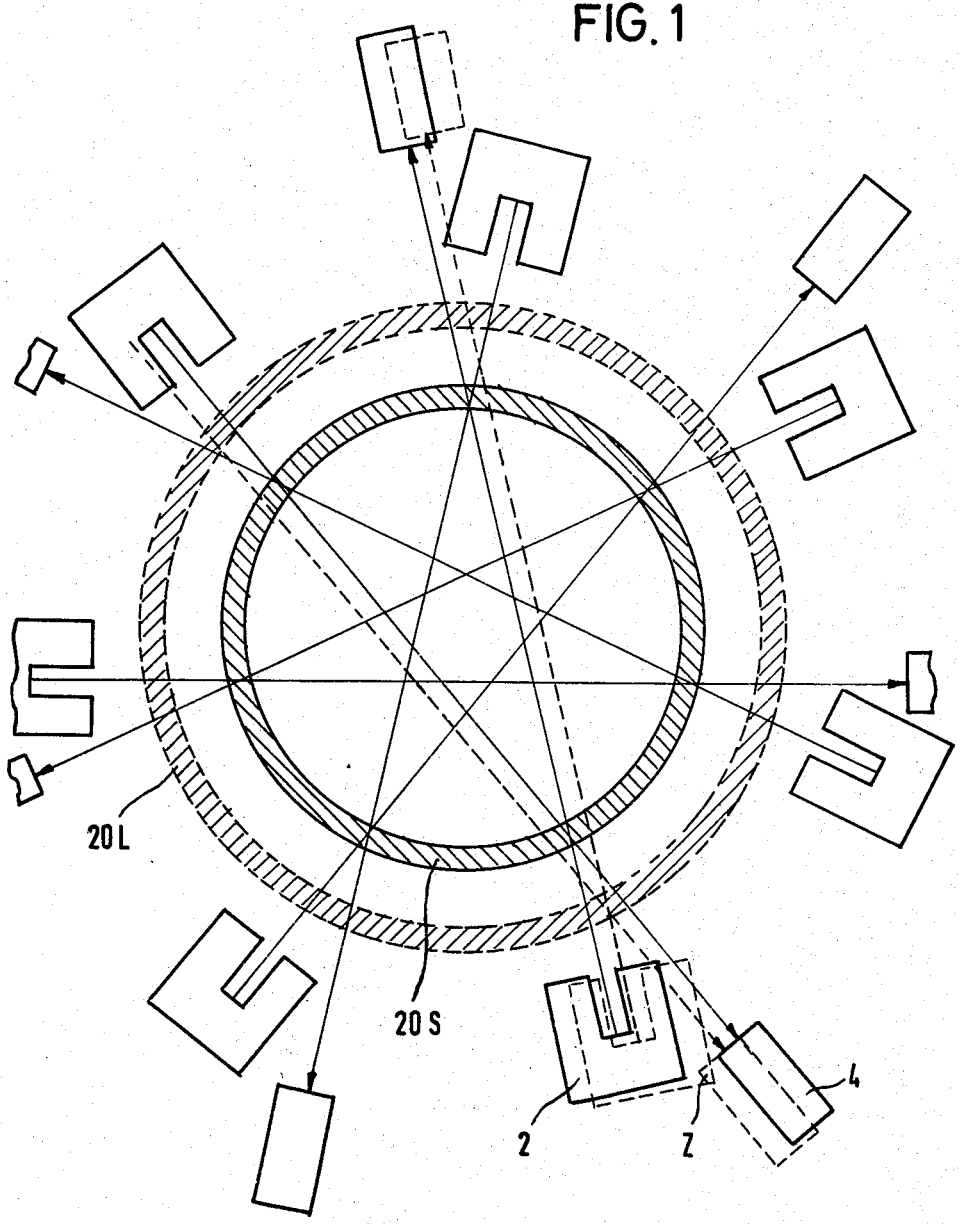
FIG. 1 shows a conventional radiation beam arrangement wherein a change of measuring device positions is required when different size tubes are being measured.
Figure 2:
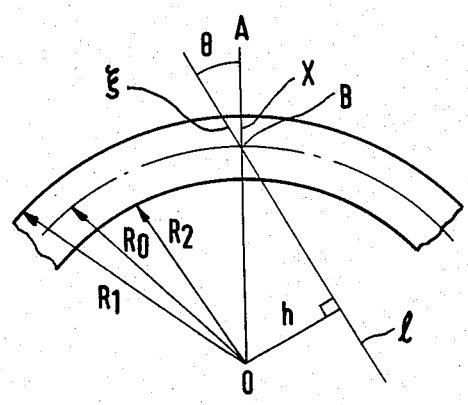
FIG. 2 is a schematic illustration of a portion of a tube, used for explaining the relationship between oblique and radial thickness of a tube.
Figure 4:
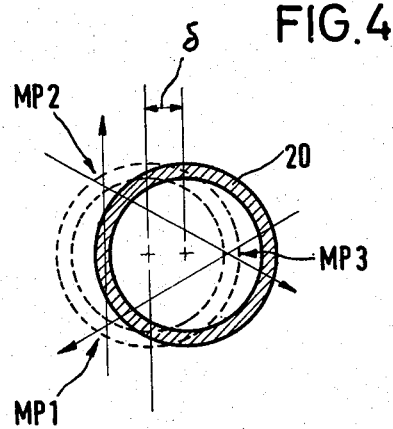
FIG. 4 is an example of such radial deflections in prior art.
Figure 5:
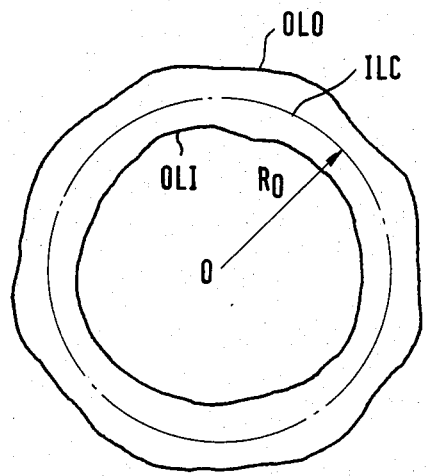
FIG. 5 shows an example of a tube section shape having uneven tube surfaces.
Figure 6:
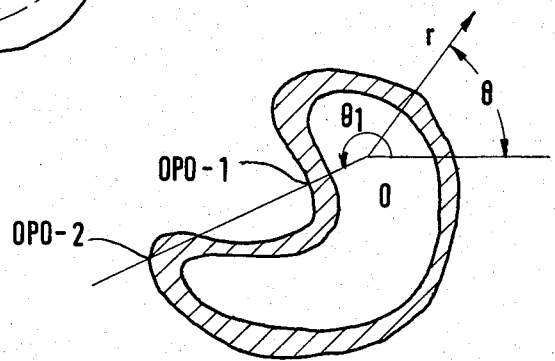
FIG. 6 shows an example of a tube section having too irregular a shape for the invention to apply.
Figure 7:
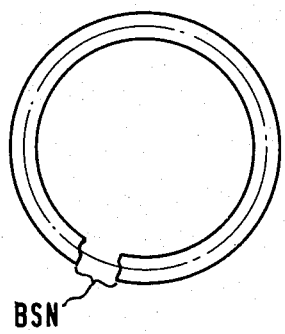
FIGS. 7 and 8 show examples of tube sections having iregular shapes, but to which the invention can be applicable.
Figure 8:
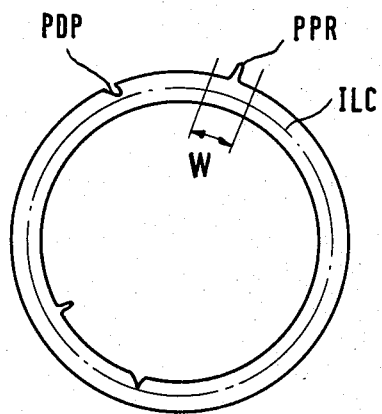
Figure 9:
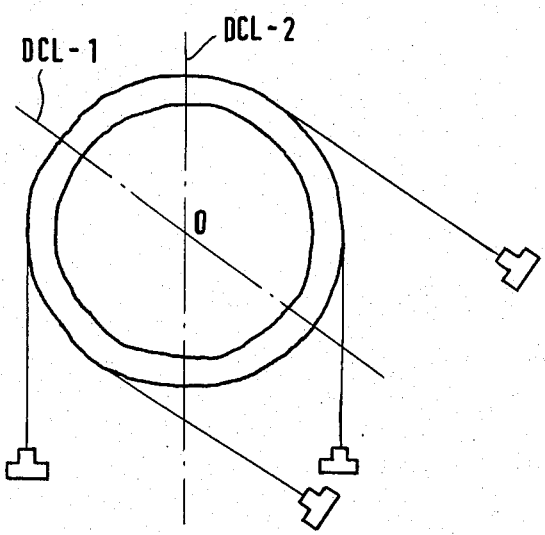
FIG. 9 shows an example of a tube section with its diameters being determined by a photoelectrical edge position detector wherein solid lines represent light beams and the dot and dash lines represent their center lines.
Figure 10:
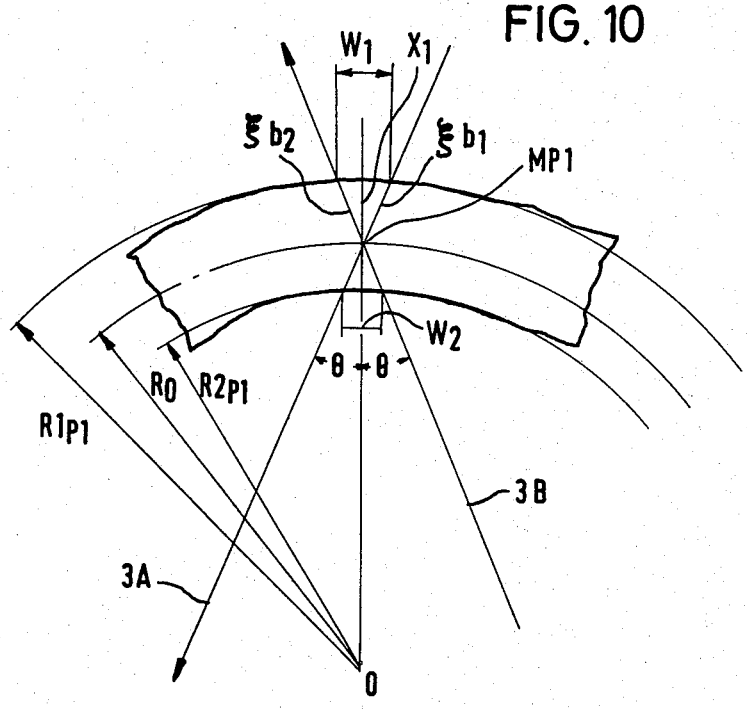
FIG. 10 shows a measured portion of a tube wall section, with two radiation beams crossing within the measuring portion.
Figure 19:
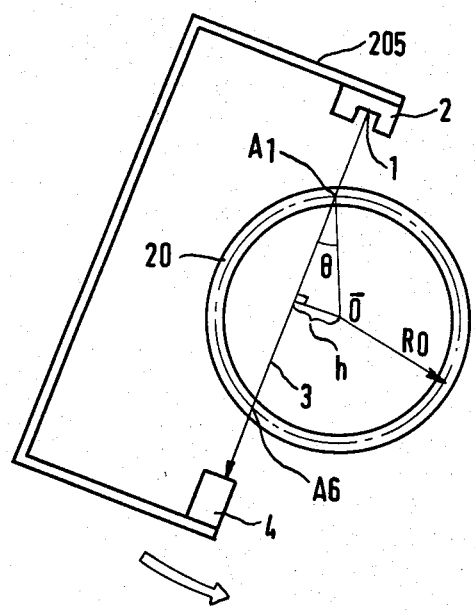
FIGS. 19 through 21 illustrate examples of three of the eight positions (appearing with the lapse of time) of a single revolving radiation beam, which form together the configuration as shown in FIG. 18.
Figure 18:
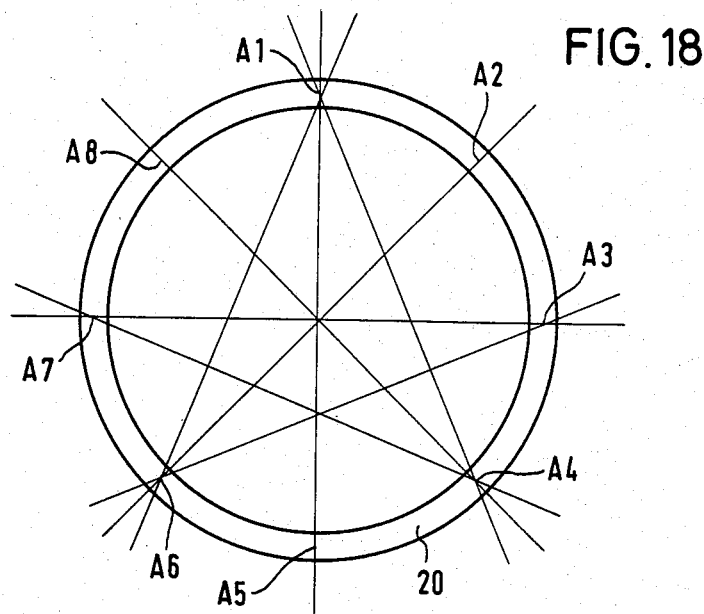
FIG. 18 is an example of an alternative arrangement of radiation positions, which require a change of a distance between the beam and the center of its revolution in the second embodiment.

In case change of angle $\theta$ is required, the measurement takes place as follows. Suppose the number of measuring points is eight and the points are distributed around a circle at regular intervals as shown in FIG. 18 (which is quite similar to FIG. 8 of the above referenced application), where the required values of that angle $\theta$ are 22.5° and 0°. For measurement at $\theta = 22.5°$, the frame 205 is set to have radiation beam 3 at a first distance h to the center 0, as shown in FIG. 19 (h=$R_0$ sin 22.5°). The measuring equipment under this setting has the radiation beam at a first position passing through measuring points $A_6$ and $A_1$. Next, after rotating the equipment by 90° around the point 0, the measuring equipment is at a second position with radiation beam passing through points $A_4$ and $A_7$ (FIG. 18). Then after rotating the equipment further by 45°, the radiation and detection operation takes place at a third position of the beam passing through points $A_3$ and $A_6$. Then rotating the equipment by 45° places the radiation and detection operation at a fourth position with the beam passing through points $A_8$ and $A_4$. The position of the radiation beam and the measuring equipment at that time is as shown by the solid line in FIG. 20. The frame 205 is then moved in the transversal direction (perpendicular both to the radiation beam and to the tube axis), so as to have the radiation beam at a second distance to the center 0 (in this case, the second distance is zero), as shown by broken lines in FIG. 20. After that, the frame is rotated further by 22.5° around the center 0, to assume a position shown by a solid line in FIG. 21. A radiation and detection operation take place, with the radiation beam at a fifth position passing through points $A_8$ and $A_4$. Then, the frame is rotated further by 45° around the center 0, and a detection of the intensity of the radiation beam is made at a sixth position with the beam passing through points $A_7$ and $A_3$. The frame is further rotated by 45°, and a detection is made at a seventh position with the beam passing through points $A_6$ and $A_2$. Finally, the frame is rotated further by 45°, and a detection is made at an eighth position with the beam passing through points $A_5$ and $A_1$. The above rotations take place successively. (In the example, the rotation or turning of the frame is counter-clockwise. No tube rotation is assumed.)

The revolving motion in the above described operation occurs incrementally or stepwise. A modification is described below, wherein the revolving motion is continuous.

Figure 22:
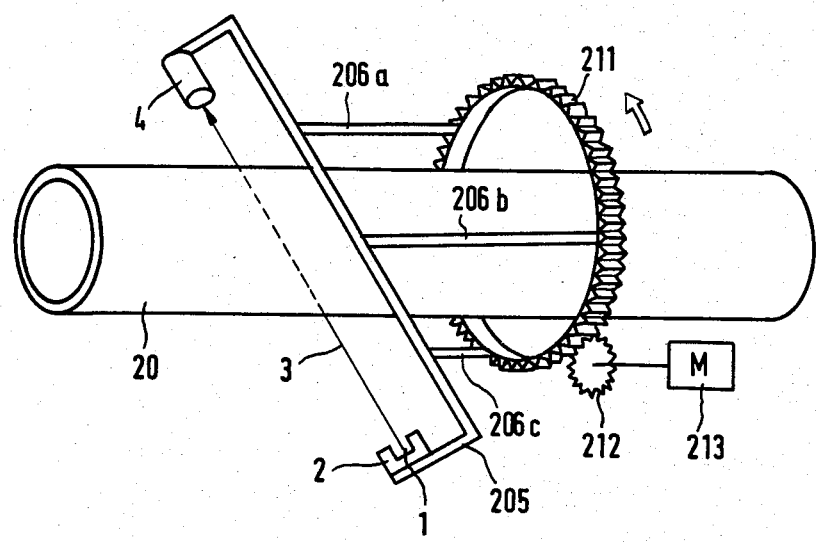
FIG. 22 illustrates an example of a revolving motion producing mechanism which can be used in the second embodiment.

The revolving motion of the measuring equipment may be produced by a mechanism shown in FIG. 22. There the frame 205 is mounted through slant stays 206a, 206b and 206c to a revolving gear wheel 211, which is rotatably supported by a round stationary member, (not shown). The radiation source 1 with container 2 and the detector 4 are mounted on the frame. The gear wheel 211 is engaged with a drive gear 212 which is coupled with a motor 213 inclusive of a certain speed-reducing device. When the motor is in continuous operation, the radiation beam system revolves around the tube 20 continuously.

When the radiation beam system revolves around the center, the detector continuously receives the radiation beam and detects its intensity. The detector output is integrated over a predetermined span of time $T_Q$ during which the radiation beam turns by a predetermined angle $\alpha_Q$, so that an effective output can be obtained. (The detector may be a radiation counter. Then, its outputs are summed up, instead of being integrated.) By repeating such an integration or summing step for each span of time $T_Q$, where steps are distributed over a cycle period for which the radiation beam system takes one full turn around the tube axis, a set of the effective output data can be obtained.

Figure 23:
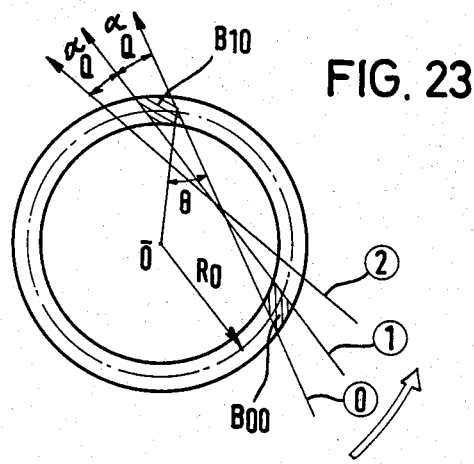
FIGS. 23 and 24 are illustrations which show revolving radiation beam positions on a tube section.

More specifically, a continuous revolving motion of the equipment turns the radiation beam for example from a first position ⓪ a time instant, to a second position ① after a duration of that time span $T_Q$, and to a third position ② after another duration of the time span $T_Q$, and so on, as shown in FIG. 23. A first one of the effective output data detecting radiation beam intensity is obtained in the first span of time $T_Q$ (i.e. during the time that the beam turns from position ⓪ to ①. A second one of the effective output data is obtained from detecting radiation in the next time span of $T_Q$ (during the time that the beam turns from position ① to ②). Alternatively, the second set of output data can be obtained during a certain other successive span of time $T_Q$, which starts later, a certain time lapse after the end of the first time span of $T_Q$.

With respect to the distribution of such time spans $T_Q$, it is assumed that a measuring point is at a center of a continuous sectional area of the tube wall for each of the spans of time $T_Q$. The time spans are to be distributed so that such measuring points can be all distributed at desired or predetermined positions.

Figure 24:
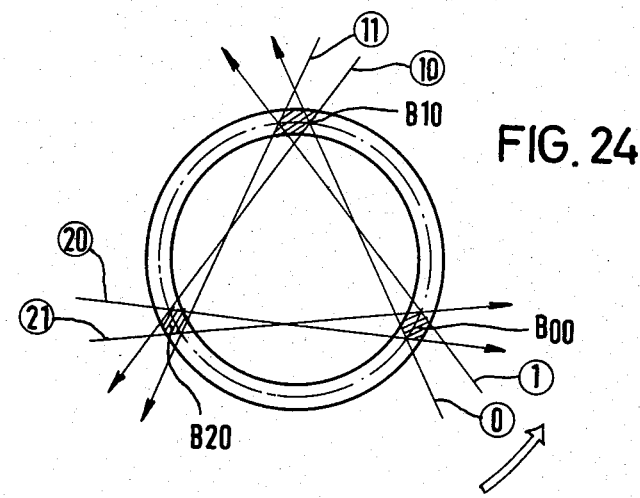

For a specific example, assuming that the revolution speed $W_{RM}$ of the frame is 20 rpm (i.e. 1 turn/3 sec.) relative to the tube, and the time span $T_Q$ is 0.1 sec., then the radiation beam turns by an angle $\alpha_Q = W_{RM} T_Q = 12°$ per each span of time T, (i.e., each angle between lines ⓪ and ①, or ① and ② or the like in FIG. 23. Assuming further that the angle $\theta$ is 60°, and the radiation beam is in its first position ⓪ at an initial time instant, then the radiation beam comes to its second position ① after that time span $T_Q = 0.1$ sec., and continues rotating. The beam comes to a fourth position ⑩ (FIG. 24) after a duration of $10 \times T_Q = 1$ sec. from the initial time instant, to a fifth position ⑪ after a time period equal to $11 \times T_Q = 1.1$ sec., and further to a sixth position ⑳ after $20 \times T_Q = 2$ sec. and to a seventh position ㉑ after $21 \times T_Q = 2.1$ sec. Then, by applying the similar method as in the former above referenced patent application, using the equations (1) through (6) set forth therein, values of mean tube wall thicknesses can be obtained. A value $x_{00}$ of mean tube wall thickness within a first sectional region $B_{00}$ defined by the lines ⓪, ①, ⑳, and ㉑ can be obtained. Another value $x_{10}$ of mean tube wall thickness within a second sectional region $B_{10}$ defined by lines ⑩, ⑪, ⓪ and ① can be obtained, and still another value $x_{20}$ of mean tube wall thickness within a third sectional region $B_{20}$ defined by lines ⑳, ㉑, ⑩ and ⑪ can be obtained. In contrast to the prior art, it should be noted that here $I_1$, $I_2$, $I_3$, $I_{10}$, $I_{20}$ and $I_{30}$ denote respective ones of output data obtained by integrating or summing-up the detector output as mentioned above.

Figure 25:
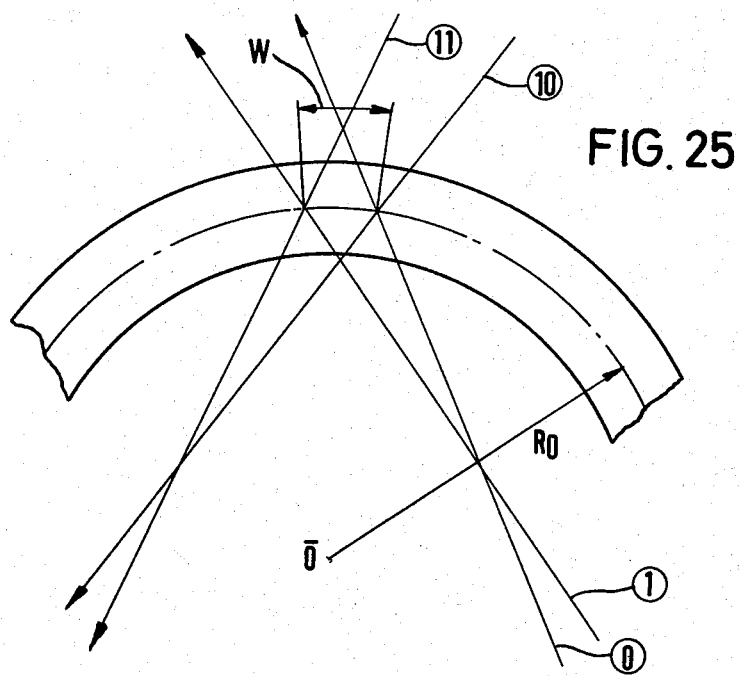
FIG. 25 is an enlargement, in part, of FIG. 24.

The resolution of a position of the measuring point in the above can be represented by a distance W along the circle of radius $R_0$ between an intersection of line ⓪ with line ⑩ and another intersection of line ① with ⑪ as shown in FIG. 25. In the case of the example below, the value of resolution w can be given by:

$$w = R_0 \frac{2\pi}{30} = \frac{\pi}{15} R_0.$$

The radiation beam may revolve at a constant relative angular velocity during its one full turn around the tube. If so, another set of effective output data can also be derived from the detector outputs. This set of data is obtained during the times that radiation beam turns from the second position ① to the third position ②, from the fifth position ⑪ to a position ⑫ by the angle $\alpha_Q$, and from the seventh position ㉑ to a position ㉒ also by the angle $\alpha_Q$, similarly as above, to give the mean tube wall thicknesses at these portions. Further, subsequent sets of effective output can be similarly obtained, to give the mean thicknesses at various portions. Thus, the above example (where $\theta = 60°$, $w = 20$ rpm $= \frac{1}{3}$ rps, and $T_Q = 0.1$ sec.) gives a result whereby wall thicknesses all around a radial section of a tube can be measured with a resolution corresponding to 1/30 of the whole peripheral length of the radial section.

While the above example uses $\theta = 60°$ and a combination of three measuring points, various variations can be similarly realized where the number n of the measuring points in a combination may be any number not less than three. Then $\theta = (\pi/2n)$. The radiation beam may have a thickness which is not very small.

Figure 26:
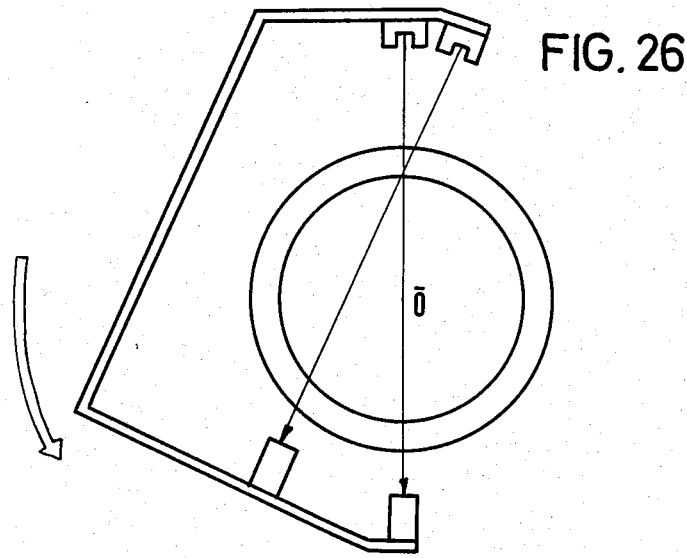
FIG. 26 shows a modification of the second embodiment of the invention, having two sets of the measuring instruments on a single revolving frame.
Figure 27:
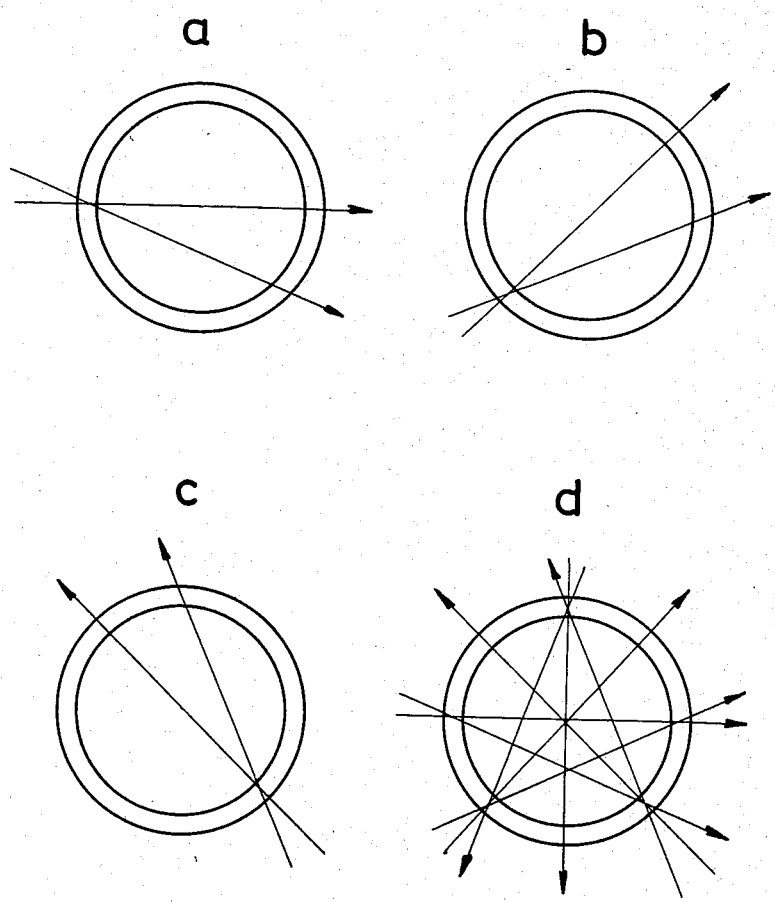
FIG. 27 shows an example of a set of radiation beam positions (appearing with the lapse of time) in case of using the equipment of FIG. 26.

FIG. 26 shows a further modification of the second embodiment of the invention. It comprises two sets of radiation instruments each of which includes a radiation source and a detector, and which are mounted on a single frame revolving around a tube being measured. The instruments produce two radiation beams at a certain angle with respect to each other. By turning the frame, the pairing radiation beams have their positions as shown in FIG. 27, parts a, b and c. By compiling those positions (a, b and c), a configuration as shown FIG. 27 part d can be obtained. This compilation is quite similar to FIG. 18 in effect. Another modification is also possible where the number of the radiation beams produced by equipment on a single revolving frame is greater than two.

In above examples of operation of the second embodiment of the invention, it is assumed for simplicity of explanation that the tube does not travel longitudinally during the time that the transmitted radiation beam intensities are being detected. However, if the tube is so travelling, the apparatus in the embodiment should be preferably provided with a relative motion pickup (such as the member 106 in FIG. 11) and accompanying delay circuits, which are inserted in electrical connections between the radiation detectors and the associated main arithmetical operation means. These mechanisms are quite similar to those 109 and 108 in FIG. 11 for the first embodiment and may each have a configuration as described in conjunction with FIG. 16. Alternatively, (provided that the relative motion pickup is used), the revolving motion producing mechanism (such as shown in FIG. 22) should further include a device for axial running, not shown, which runs the measuring instruments longitudinally at a speed regulated by additional control means, so that the pickup output indicating the relative axial motion substantially disappears.

Also, preferably, the apparatus of the second embodiment should be further provided with another relative motion pickup which functions similarly to that member 106 in FIG. 11, but which senses a relative rotatory motion of the tube to the apparatus body in the peripheral direction. Then the apparatus can be used even in the case where it should revolve for measurement while the tube rotates. The relative motion in this case is the difference between the motions of the tube and the motion of the measuring instrument.

Figure 28:
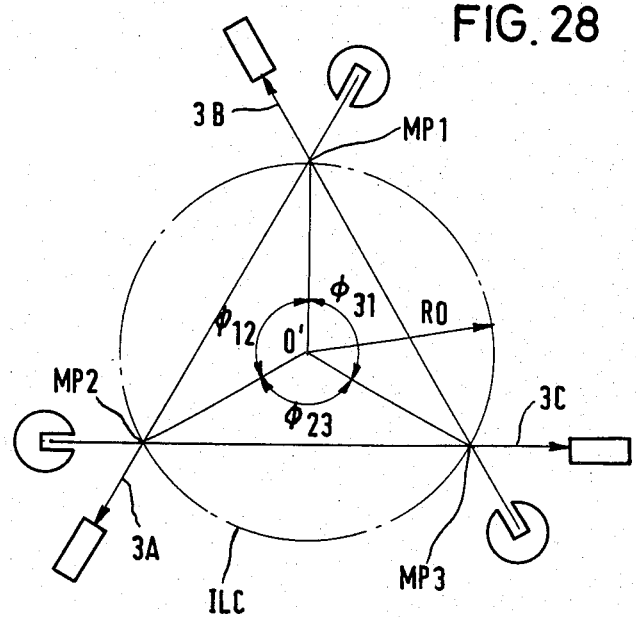
FIG. 28 is a schematic illustration of an example of a radiation beam position arrangement of a third embodiment of the invention.
Figure 29:
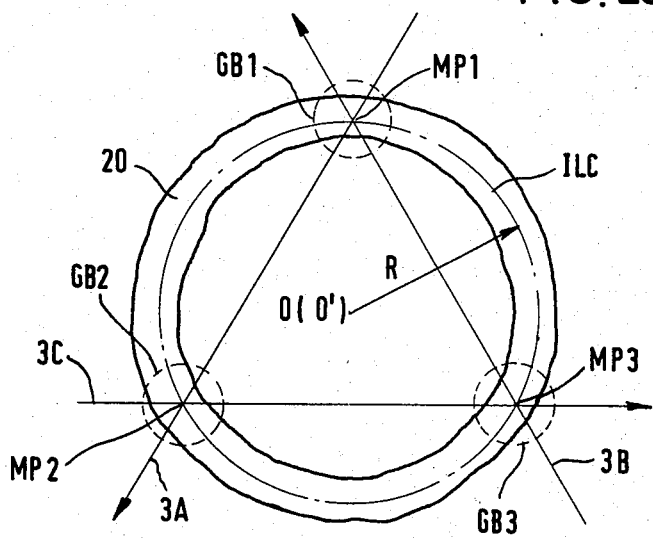
FIG. 29 is an illustration of a typical shape of a tube section of FIG. 28.

FIG. 28 is a schematic illustration of a radiation beam system arrangement comprising third embodiment of the present invention, applied to a case where the wall of a tube 20 as shown in FIG. 29 should be measured by thickness in three measuring portions GB1, GB2 and GB3. The center O of the measured section of the tube is determined according to a certain definition, as mentioned above.

While the configuration of the measuring system shown in FIG. 28 may at first seem identical to those systems already shown in the above reference prior art application, it differs from those systems in several significant respects.

The measuring points MP1, MP2 and MP3 are vertices forming equilateral polygon in the instant application (in FIG. 28, the polygon is a triangle). In the prior art, such a measuring point arrangement is not essential.

The measuring equipment of the present application is disposed in a position such that the center $O'$ of that polygon coincides or substantially coincides with the center O of the tube section in the above mentioned sense, and that a genuine circle ILC which passes through all the measuring points exists between the outer and inner contours of the measured section of the tube, at least within every measuring portion GB1, GB2 or GB3. More specifically, the measuring equipment should be disposed so that the distance $\overline{OO'}$ between the centers O and $O'$ of the tube section and the measuring system polygon is given by $\overline{OO'}/R_{1m} < 1$, where $R_{1m}$ denotes an expected average value of outer radius of the tube, so that a radius $R_0$ of that genuine circle is adequately smaller than $R_{1m}$ and adequately larger than an expected average value $R_{2m}$ of inner radius of the tube. This latter requirement for the value of $R_0$ may be preferably satisfied by setting it substantially equal to an average of $R_{1m}$ and $R_{2m}$, i.e. as $$R = \tfrac{1}{2}(R_{1m} + R_{2m}) \qquad (IV.\ 1)$$

or $$R = \sqrt{R_{1m} + R_{2m}} \qquad (IV.\ 2)$$

or $$R = \sqrt{R_{1m} \cdot R_{2m}2} \qquad (IV.\ 3)$$

Particularly, from the standpoint of resolution for uneven tube surface spots (or for spots of uneven tube wall thickness) to be caught by the pairing radiation beams, it is preferable to set the value of $R_0$ (i.e. the radial position of the measuring points) so as to substantially meet either of the above conditions. With respect to the resolution, a description is given below with reference to FIGS. 30 and 31.

Figure 21:
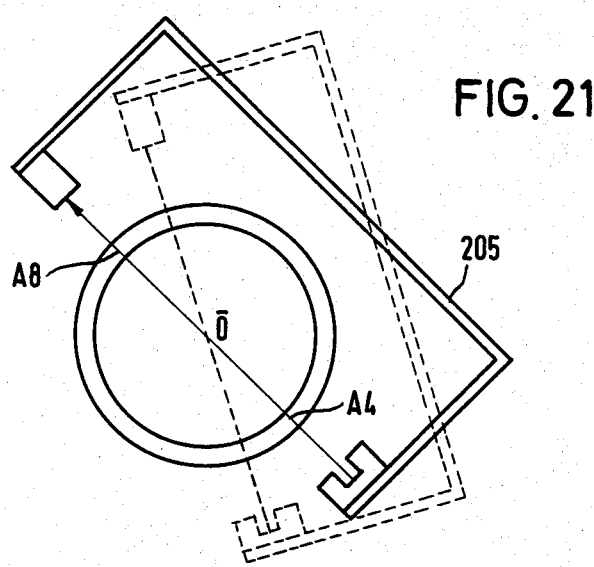
Figure 30:
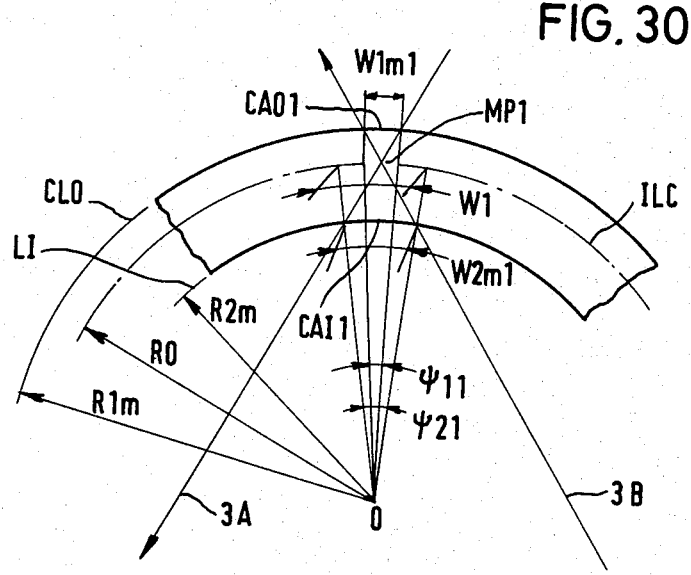
FIG. 30 is an enlargement in part of FIG. 29.
Figure 31:
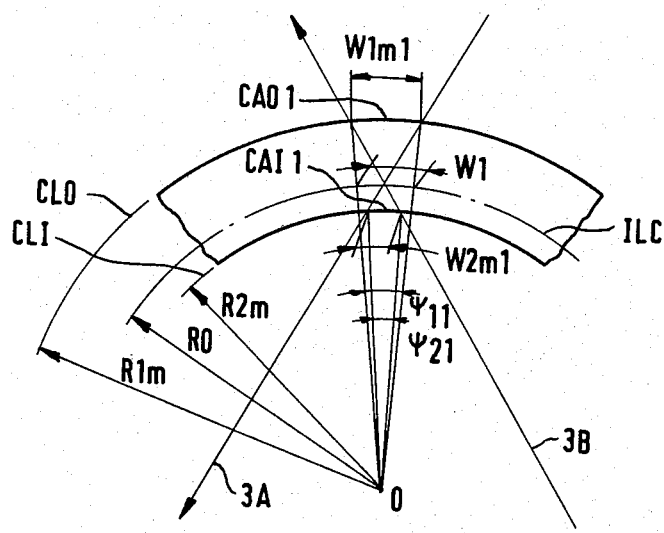
FIG. 31 is a view of the tube section of FIG. 30, but wherein the measuring point has a slightly different position.

FIG. 30 is an enlargement of part of the illustration around the portion GB 1 of FIG. 29. There, $W_{1m1}$ denotes a length of an outer arc $CA0_1$ intercepted by the two radiation beams from a circle CL0 which has its center at the point 0 and a radius of $R_{1m}$. $W_{2m1}$ denotes a length of an inner arc CAI 1 intercepted by the radiation beams from another circle CLI which has its center at the point 0 and a radius of $R_{2m}$. (For simplicity of explanation, it will be assumed hereinafter that the centers 0 and $0'$ entirely coincide with each other.) Angles $\psi_{11}$ and $\psi_{21}$ are respective angles of the arcs $CA0_1$ and $CAI_1$ as viewed from the point 0. The above lengths are given by $W_{1m1} = \psi_{11} R_{1m}$ and $W_{2m1} = \psi_{21} R_{2m}$. The resolution at the measuring point MP1 can be given by an angle $\psi_1$, which is the larger of the angles $\psi_{11}$ and $\psi_{21}$, or by the length $W_1 = \psi_1 R_0$. In the case of FIG. 30, it is given by $\psi_{21}$ or $W_1 = \psi_{21} R_0$, since $\psi_{21} > \psi_{11}$ there. In the case of FIG. 21, which is a similar to FIG. 30, but different in the value of radius $R_0$, having relation of $\psi_{11} > \psi_{21}$ then the resolution is given by $\psi_{11}$ or $W_1 = \psi_{11} R_0$. As simply found, it is preferable to set the value of $R_0$ so as to have $\psi_{11} = \psi_{21}$ for the best resolution, and results from the aforementioned condition of $R_0$ with respect to $R_{1m}$ and $R_{2m}$. (See equations IV. 1, IV. 2 and IV. 3 above)

Figure 32:
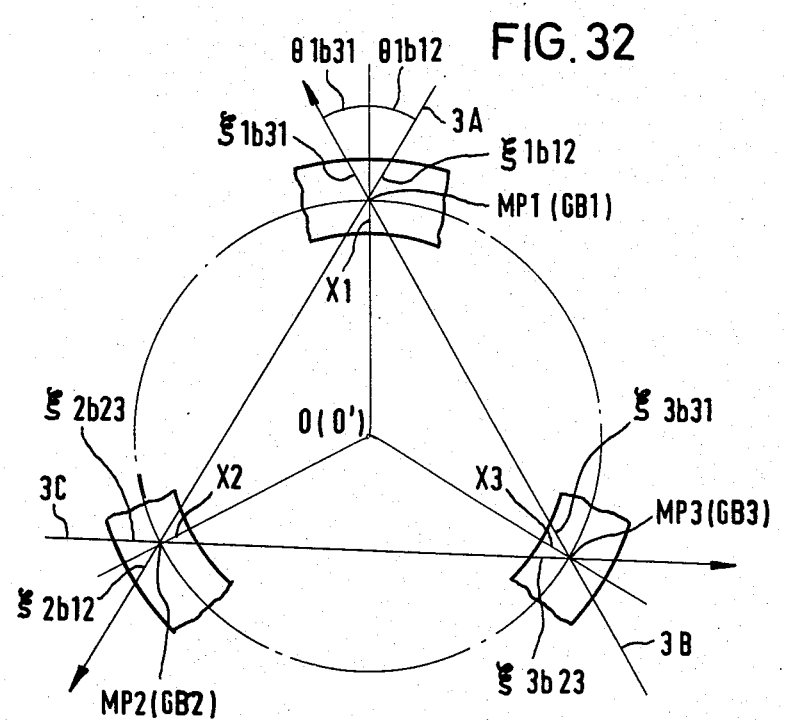
FIG. 32 shows a measuring arrangement of FIG. 28, but with contours of three measured portions illustrated.

In the third embodiment, the measuring system has its radiation beams 3A, 3B and 3C disposed with respect to the tube position pursuant to the conditions. FIG. 32 shows the three radiation beams of such a measuring system, together with three portions of the measured section of tube. Here, each of the three tube portions (GB1, GB2 and GB3) is represented by a sectorial portion defined by an outer circular contour and an inner circular contour. Each circular contour is a part of such a circle as denoted by CL0 or CLI in FIG. 30 and FIG. 31. That is to say, the sectorial portions in FIG. 32 are respective simulations of the actual tube portions. Also, the technique in the embodiment is applicable to the case where such simulation is reasonable or allowable.

In FIG. 32, the variables $\xi_{1b12}, \xi_{2b12}, \xi_{2b23}, \xi_{3b23}, \xi_{3b31}$ and $\xi_{1b31}$ denote transit path lengths of radiation beam 3A across measuring portion GB1 and across portion GB2, of beam 3C across portion GB2 and across portion GB3, and of beam 3B across portion GB3 and across portion GB1, respectively. The quantities which can be obtained by the transmitted radiation beam intensity detection are the values of $d_{12}$, $d_{23}$ and $d_{31}$ where:

$$\xi_{1b12} + \xi_{2b12} = d_{12}$$
$$\xi_{2b23} + \xi_{3b23} = d_{23}$$
$$\xi_{3b31} + \xi_{1b31} = d_{31} \qquad (IV.\ 4)$$

The set of formulas (IV. 4) comprises three equations including six unknowns, so that it cannot be solved as it is. However, in the technique of the embodiment, we can have the following additional conditions.

The first condition is that since the triangle formed by the measuring points MB1, MB2 and MB3 (i.e. the triangle formed by the three radiation beams or beam axes) is an equilaterial one, the two angles $\theta_{1b12}$ and $\theta_{1b31}$ are equal to each other. (Angles $\theta_{1b12}$ and $\theta_{1b31}$ are angles between the radial line leading from the center 0 through a measuring point MB1 and one radiation beam 3A passing through the measuring point MB1, and between the same radial line and the other radiation beam 3B passing through the same measuring point MB1.) The similar relation applies also to the other measuring portions.

The second condition is that practical simulation is effectuated of both outer and inner contours within each measuring portion, by reason of the aforementioned positioning of the measuring system, so that the circles of the contours are concentric with each other. That is, the two radiation beam transit paths intercepted by the circles within a single measuring portion are symmetrical with respect to the radial line through the center 0 and the measuring point therein.

From the above two conditions we obtain the following:

$$\xi_{1b12} = \xi_{1b21} = \xi_1$$

$$\xi_{2b12} = \xi_{2b23} = \xi_2$$

$$\xi_{3b31} = \xi_{3b23} = \xi_3 \qquad \text{(IV. 5)}$$

From above equations (IV. 4) and (IV. 5), the simultaneous equations can be obtained:

$$\xi_1 + \xi_2 = d_{12}$$

$$\xi_2 + \xi_3 = d_{23}$$

$$\xi_3 + \xi_1 = d_{31} \qquad \text{(IV. 6)}$$

These are three equations with three unknowns, and can thus be solved.

While the above technique applies to the case of three measuring points, the technique can similarly apply to other various cases having various numbers of measuring points, so that sets of surely solvable equations can be obtained. The method of solving them is quite similar to that method mentioned in the former patent application. By taking an example, in the above case, Eq. (IV. 6) is represented by matrices as below $$\begin{pmatrix} 1 & 1 & 0 \\ 0 & 1 & 1 \\ 1 & 0 & 1 \end{pmatrix} \begin{pmatrix} \xi_1 \\ \xi_2 \\ \xi_3 \end{pmatrix} = \begin{pmatrix} d_{12} \\ d_{23} \\ d_{31} \end{pmatrix} \qquad \text{(IV. 7)}$$

and solving Eq. (IV. 7), then $$\left. \begin{array}{l} \xi_1 = \tfrac{1}{2}(d_{12} - d_{23} + d_{31}) \\ \xi_2 = \tfrac{1}{2}(d_{23} - d_{31} + d_{12}) \\ \xi_3 = \tfrac{1}{2}(d_{31} - d_{12} - d_{23}) \end{array} \right\} \qquad \text{(IV. 8)}$$

are given.

Thus, the radiation beam transit path lengths ($\xi_1$, $\xi_2$ and $\xi_3$) across the tube wall are obtained, though they represent the tube wall thicknesses measured in the directions of the radiation beams, and not the wall thicknesses in the radial directions of the tube.

However, such obtained values of the tube wall thickness (a kind of oblique thickness) can adequately serve to examine the quality of tubular products, for example, to examine any non-uniformity in wall thickness.

If values of radial thickness of the tube wall are required, they can be given, using the following conditions.

An outer radius (or outer diameter) of a tubular product is substantially equal to its standard value, which is known beforehand or by some appropriate means. In manufacturing an actual tubular product such as a seamless steel pipe, it is rather easy to have its outer surface of a shape genuinely circular in section with high accuracy, though it is relatively hard to have a precise uniformity of its wall thickness. For example, a Japanese Industrial Standard (JIS) No. 3439 of 1979 specifies the allowable errors in outer diameter and tube wall thickness of seamless steel pipes for oil well use. In table 7, thereof, the allowable error in outer diameter of such pipes should be ±0.8 mm for diameters of 101.6 mm or less and be ±0.75% for diameters of 114.3 mm or more, while the allowable error in wall thickness should be ±12.5% for both. Thus, the percentage allowable deviation in wall thickness is substantially higher for tube wall thickness than for tube diameter.

There is a relation as indicated by Eq. (I.2) between the values of $\xi$ and x. (here, $\xi$ represents each of $\xi_1$, $\xi_2$ and $\xi_3$ and x represents a radial thickness corresponding to it.) And, from Eq. (I.2), the following can hold. That is $$x^2 - 2R_1 x - \xi^2 + (A - \xi)\xi = 0 \qquad \text{(IV. 9)}$$

where $$A = 2 \cdot \sqrt{R_1^2 - (R_o \sin \theta)^2} \qquad \text{(IV. 10)}$$

and where values of $R_0$ and $\theta$ are known.

From the above, the value of $R_1$ can be deemed known. Then the value of A in above Eq. IV. 10 can be also known. So, by solving Eq. IV. 9, the required value of x can be given by $$x = R_1 - \sqrt{R_1^2 - (A - \xi)\xi} \ . \qquad \text{(IV. 11)}$$

Thus, the value of a radial thickness of a tube wall is also obtainable.

Further examples will be mentioned for cases having more than three measuring points.

Figures 33, 34:
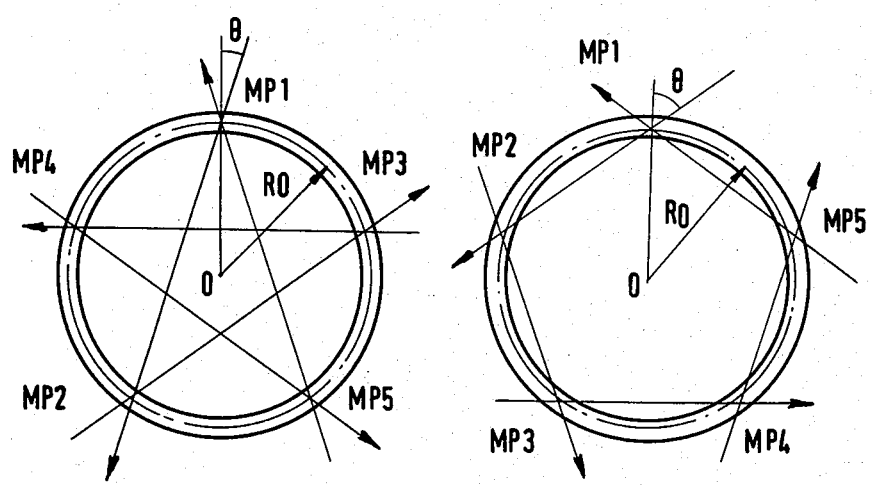
FIGS. 33 through 39 show variations of radiation beam position arangement to be used in the third embodiment of the invention.

In the case of five measuring points, their arrangement can be as shown in FIG. 33 or in FIG. 34. MP1 through MP5 are the measuring points which are positioned at vertexes of an equilateral pentagon. Using $\xi_1$, $\xi_2$, $\xi_3$, $\xi_4$ and $\xi_5$ for oblique thicknesses at respective measuring points, and using $d_{12}$, $d_{23}$, $d_{34}$, $d_{45}$ and $d_{51}$ for detected transmitted intensities (multiplied by a coefficient) of respective radiation beams passing the points MP1 and MP2 and MP3, and so on, the following equation in matrix form can hold.

$$\begin{pmatrix} 1 & 1 & 0 & 0 & 0 \\ 0 & 1 & 1 & 0 & 0 \\ 0 & 0 & 1 & 1 & 0 \\ 0 & 0 & 0 & 1 & 1 \\ 1 & 0 & 0 & 0 & 1 \end{pmatrix} \begin{pmatrix} \xi_1 \\ \xi_2 \\ \xi_3 \\ \xi_4 \\ \xi_5 \end{pmatrix} = \begin{pmatrix} d_{12} \\ d_{23} \\ d_{34} \\ d_{45} \\ d_{51} \end{pmatrix} \qquad \text{(IV. 12)}$$

By solving Eq. (IV. 12), the value of $\xi_1$ through $\xi_5$ can be obtained. Then the values of corresponding radial thicknesses can also be obtained, using the known value of $\theta$ (here, $$\theta = \frac{\pi}{2 \times 5} = \frac{\pi}{10}$$

for the case of FIG. 33, and $\theta = (3\pi/10)$ for FIG. 34).

Figure 35:
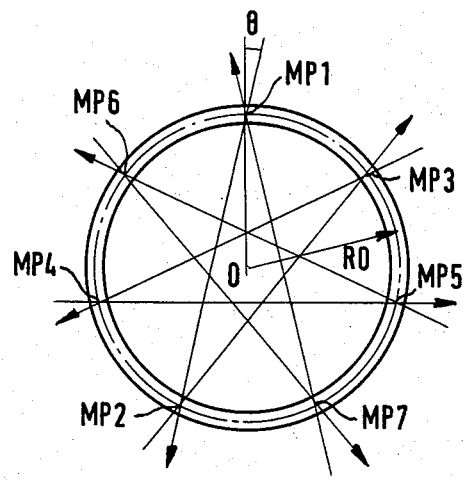
Figure 36:
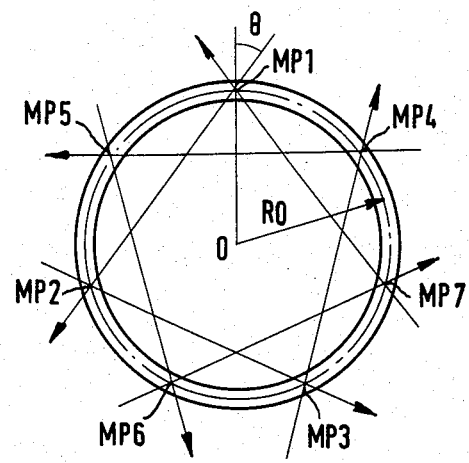
Figure 37:
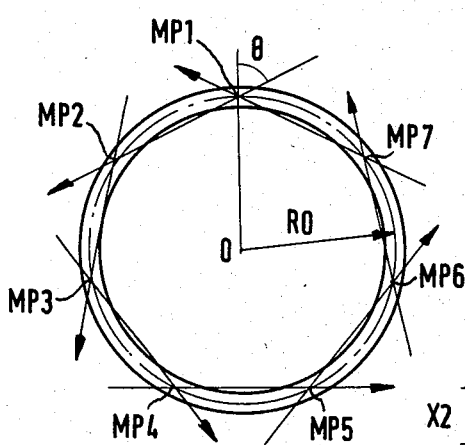
Figure 38:
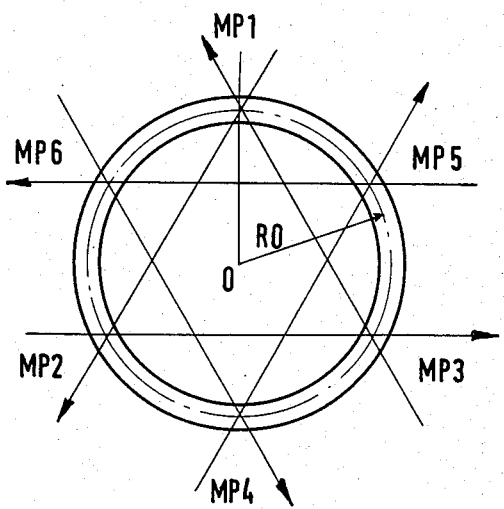
Figure 39:
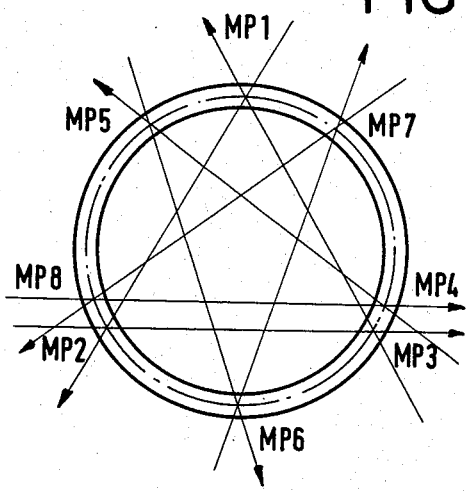

FIGS. 35, 38 and 39 respectively show arrangements of seven, six and eight measuring points. FIGS. 38 and 39 are each an example of a combination of two polygons. Values of $\xi$'s and x's can be obtained in a manner similar to that for either the three or five measuring point arrangements.

Also, in various cases using at least three measuring points, similar equations can be obtained.

Generally, the equations will take the form:

$$\begin{pmatrix} 1 & 1 & 0 & 0 & 0 & \cdots & \cdots & 0 & 0 \\ 0 & 1 & 1 & 0 & 0 & \cdots & \cdots & 0 & 0 \\ 0 & 0 & 1 & 1 & 0 & \cdots & \cdots & 0 & 0 \\ 0 & 0 & 0 & 1 & 1 & \cdots & \cdots & 0 & 0 \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ 0 & 0 & 0 & 0 & 0 & \cdots & \cdots & 1 & 1 \\ 1 & 0 & 0 & 0 & 0 & \cdots & \cdots & 0 & 1 \end{pmatrix} \cdot \vec{\xi} = \vec{d} \quad \text{(IV. 13)}$$

where $\vec{\xi}$ denotes a column vector comprising $\xi$s, and $\vec{d}$ denotes a column vector of values of detected radiation beam intensities by a coefficient. A value of $\theta$ in that case can be given by $$\theta = \frac{1}{2}\left(\pi - \frac{2\pi}{n} \cdot i\right) = \frac{(n - 2i)\pi}{2n} \quad \text{(IV. 14)}$$

where n denotes the number of measuring points and i is an integer determined dependent on the particular arrangement of radiation beams. (Specifically, i is the number of sides of a shorter polygon periphery intercepted by two measuring points on one radiation beam).

Figure 40:
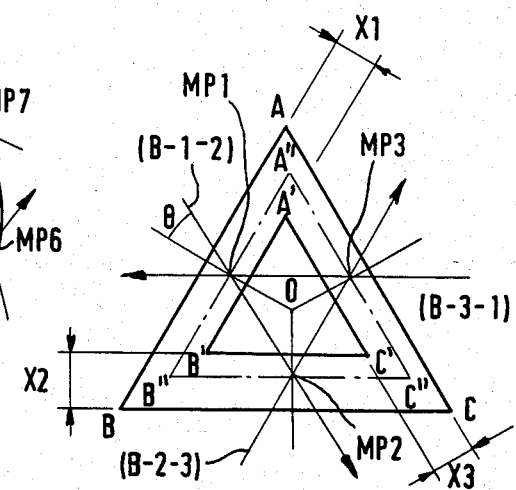
FIGS. 40 through 43 show a variations of radiation beam position arrangement for the third embodiment, but for polygonal tube sections.

Similarly, a tube having a polygonal section can also be measured. FIG. 40 shows an example for a polygon of a regular triangle section, having an outside of $\triangle ABC$ and an inside of $\triangle A'B'C'$. Suppose there are three measuring points at points MP1, MP2 and MP3 on a periphery of a regular triangle $A''B''C''$, generated within the tube section. Here, the points MP1, MP2 and MP3 are the bases or foots of the perpendiculars from the center 0 to the sides of $\triangle A''B''C''$. Reference characters (B-1-2), (B-2-3) and (B-3-1) show three radiation beams, and $x_1$, $x_2$ and $x_3$ are thicknesses to be examined. Using $\xi_1$, $\xi_2$ and $\xi_3$ for the oblique thicknesses in radiation beam directions at respective measuring points, and $d_{12}$, $d_{23}$ and $d_{31}$ for values obtained by the transmitted radiation beam intesity detection, similarly as above, the following equation can hold. That is $$\left.\begin{array}{l} \xi_1 + \xi_2 = d_{12} \\ \xi_2 + \xi_3 = d_{23} \\ \xi_3 + \xi_1 = d_{31} \end{array}\right\} \quad \text{(IV. 15)}$$

Solving Eq. (IV. 15), values of $\xi_1$, $\xi_2$ and $\xi_3$ are obtained, and then $x_1$, $x_2$ and $x_3$ are given by $x_i = \xi_i \cos$ (here, $\theta = 30°$).

Figure 41:
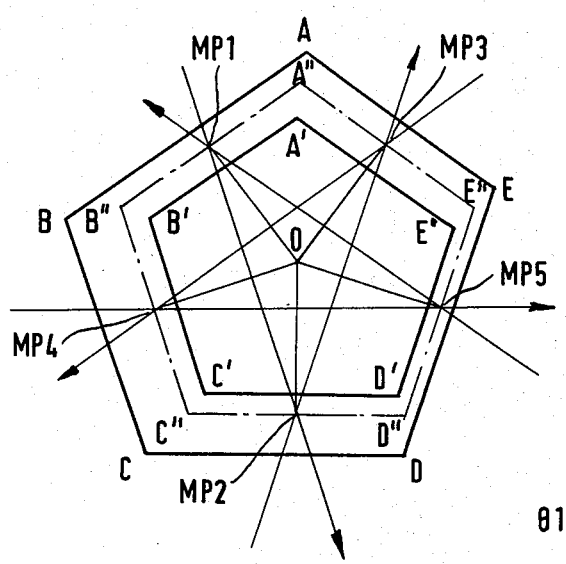
Figure 42:
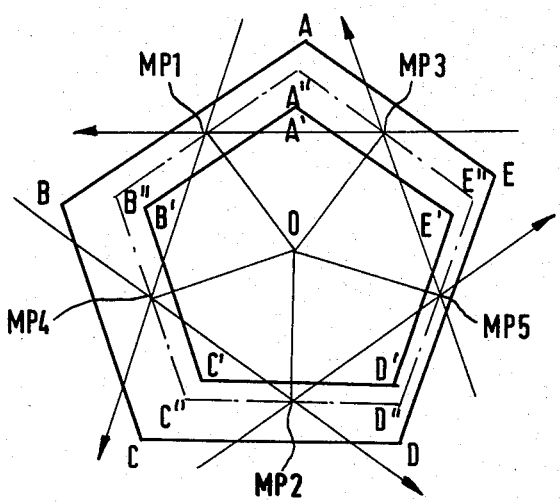

FIGS. 41 and 42 show other examples for a pentagonal tube section which can have a regular pentagon periphery $A''B''C''D''E''$ within its region. Five measuring points MP1 through MP5 form a regular pentagon. A similar procedure and method as described above can be used, and wall thicknesses can be obtained. In case of any other polygonal tube section having a line of a regular polygon within it, a similar procedure and method can be used. (A circle is a kind of regular polygon with an infinite number of vertices).

Figure 43:
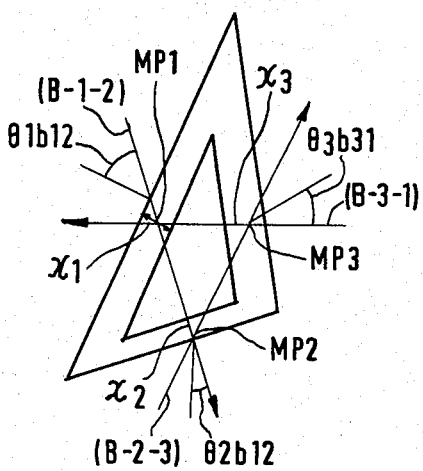

Further, even though a polygonal tube section has no line of a regular polygon within its region, the above described measuring method can be used, by using a slight modification thereof. For example, in a triangular case as shown in FIG. 43, the following equations can be used:

$$\begin{pmatrix} 1/\cos\theta_{1b12} & 1/\cos\theta_{2b12} & 0 \\ 0 & 1/\cos\theta_{2b23} & 1/\cos\theta_{3b23} \\ 1/\cos\theta_{ib31} & 0 & 1/\cos\theta_{3b31} \end{pmatrix} \begin{pmatrix} x_1 \\ x_2 \\ x_3 \end{pmatrix} = \begin{pmatrix} d_{12} \\ d_{23} \\ d_{31} \end{pmatrix}$$

where $\theta_{1b12}$ etc. denote angles as shown in the figure. The wall thicknesses can thus be obtained. For polygonal tube sections involving no regular polygon line and having a large number of sides, however, the operation may become slightly complicated due to the uniformity of angles $\theta$ and processes to measure them.

In the above description of the third embodiment, each radiation beam is taken as a line, i.e. having only one dimension. If it is replaced by a beam having an actual width or thickness, the same result can be derived, except that the resolution becomes wider, as compared to the method of FIGS. 30 and 31, due to the increased radiation beam thickness.

Figure 44:
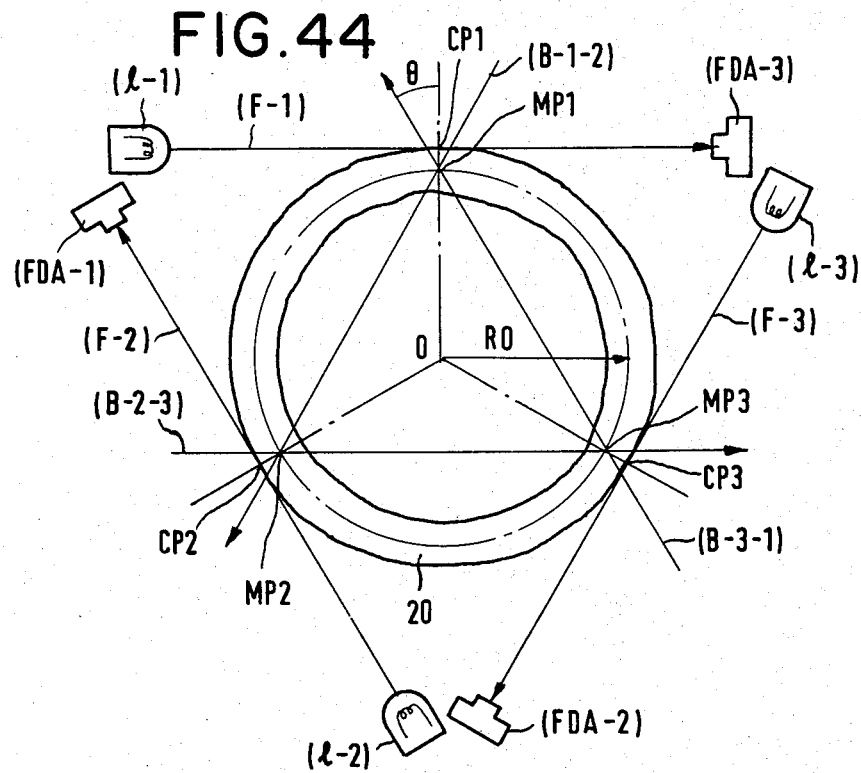
FIG. 44 shows a modification of the third embodiment, with other non-contactive edge position detecting device (here photoelectrical) used together with radiational thickness measuring equipment, arranged around a tube section.

FIG. 44 shows an alternative of the third embodiment of the invention. It is featured by the use of photoelectrical position detecting devices so that the light beams are tangent to the outside of a tube 20. Each of three photoelectrical devices comprises a light projector (1-1), (1-2) or (1-3) and a light receiver (FDA-2), (FDA-1) or (FDA-1). The projector produces a light beam (F-1), (F-2) or (F-3) directed to the receiver. Each of these devices performs as it is moving in a radial direction of the tube, to detect where the light beam is in contact with and tangent to the tube's outside surface. (CP1, CP2 and CP3 are such contact points.)

The photoelectrical devices are arranged so that each light beam is perpendicular to a radial line which passes through one measuring point and the center 0. When the light beams are positioned so that they are in contact with the tube surface, respective outer radii are defined (i.e. distances from 0 to CP1, CP2 and CP3) in the three radial directions passing through the measuring points MP1, MP2 and MP3. The results can be used as the values of outer radius $R_1$ in Eq. (IV. 10).

A photoelectrical device serves for a very quick position detection with its feature of rapid response performance in general. So, this alternative shortens the time duration for measurement, improves the accuracy, and also simplifies the measurement process for tube sections which are not precisely circular. If the tube body is already luminous by itself (for example, due to its high temperature), the light projectors described above may be eliminated, and only directional light receivers will be needed.

In the third embodiment, the arrangement of having multiple radiation beam positions around a tube may be realized by having either multiple sets of radiation source and detectors stationary to the tube body, or by having only one measuring set comprising one radiation source and detector which revolve in relation to the tube body, similar to that mentioned in the second embodiment of the invention.

Figure 45:
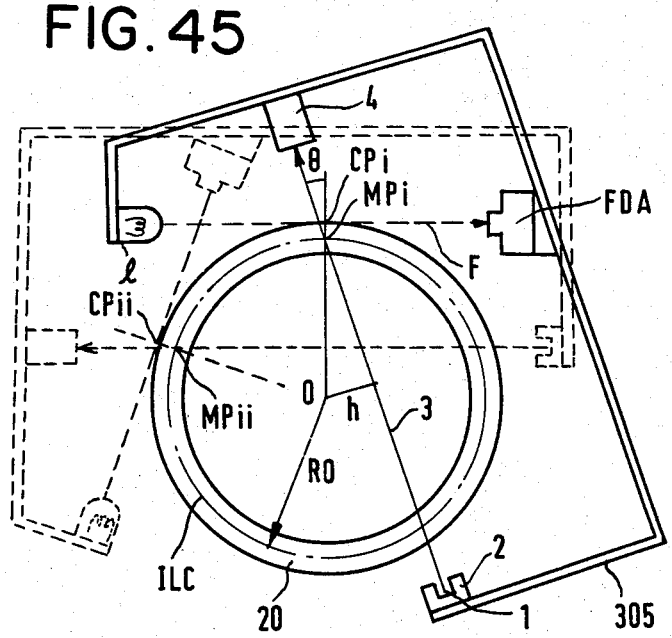
FIG. 45 shows yet another modification of the third embodiment with a set of radiational instrument and a non-contactive (here photoelectrical) edge positon detecting device both mounted on a single revolving frame.

FIG. 45 shows another modification of the third embodiment of the invention. It comprises a set of the radiational instrument and another non-contactive (e.g. photoelectrical) edge position detection instrument. The former radiational instrument consists of a radiation source 1 producing a radiation beam 3, and a detector 4. The photoelectrical edge position detection instrument consists of a light projector producing a light beam F, and a light receiver FDA. Both the radiational and photoelectrical instruments are mounted on a single frame 305, which revolves around a tube 20 to be examined, with the instruments in position on the frame so that the light beam F lies perpendicular to a radial line leading from the center 0 of the frame revolution to the intersection of the radiation beam 3 and a circle ILC (with the circle passing through all the measuring poits MP1, MP2, etc.). The point 0 also represents the assumed center of the tube. The photoelectrical instrument is radially movable to catch the tangential contact points CP1, CP2, etc., i.e. to get the outer radii of the tube, at the outside of the respective measuring points. The radiational instrument catches the oblique thicknesses at the measuring points. As the frame makes one revolution, the instruments produce the necessary data for obtaining the radial thicknesses at the measuring points.

Figure 46:
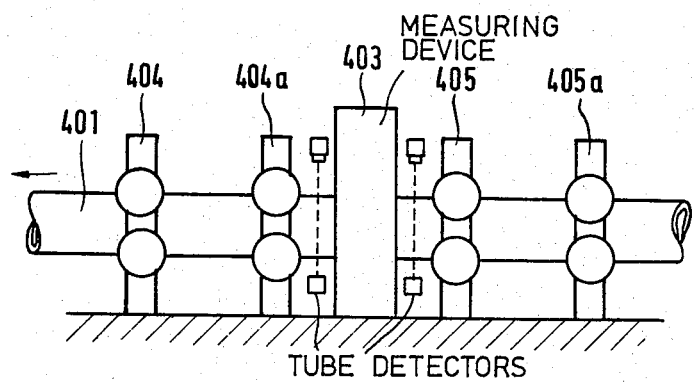
FIGS. 46 and 47 are a side view and a front view, respectively, of a radial deflection of a tube.
Figure 47:
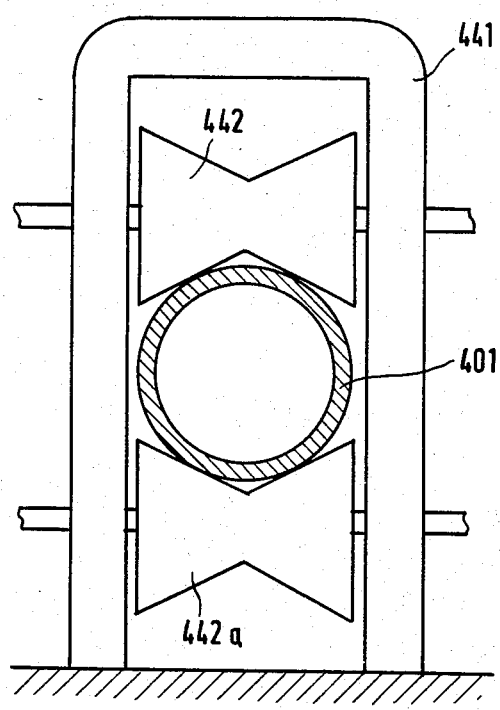

FIGS. 46 and 47 show an embodiment of a supporting means to steady the surface of a tube being measured, which is another feature of the present invention.

FIG. 46 shows the outline of configuration of the supporting means. Reference numeral 403 denotes a tube wall thickness measuring device, and each of numerals 404, 404a, 405 and 405a denotes a pinch roller stand. A tube 401 runs in the direction of the arrow, and passes through the measuring device 403. The pinch roller stands include a mechanism to steady the tube surface. The number of the stands need not necessarily always be four.

FIG. 47 is a front view showing a fundamental configuration of the pinch roller stand. It comprises a housing 441 and a pair of pinch rollers 442 and 442a having their shafts held by the housing. Each pinch roller defines a V-shape constriction in its middle. The tube is sandwiched by the pair of pinch rollers (vertically in FIG. 47) so that the tube axis deflection will be minimized. The vertical arrangement of the pairing pinch rollers as seen in FIG. 47 is not the only possible arrangement. For example, their arrangement may be horizontal, oblique or in any other direction. Also, plurality of the pinch roller stands in a set of equipment may have a plurality of such directions of the pairing pinch rollers. For example, in the equipment of FIG. 46, the pinch roller stands 404 and 405 may hold the tube vertically, while the stands 404a and 405a may hold the tube horizontally. Such an arrangement may be more effective.

Figure 48:
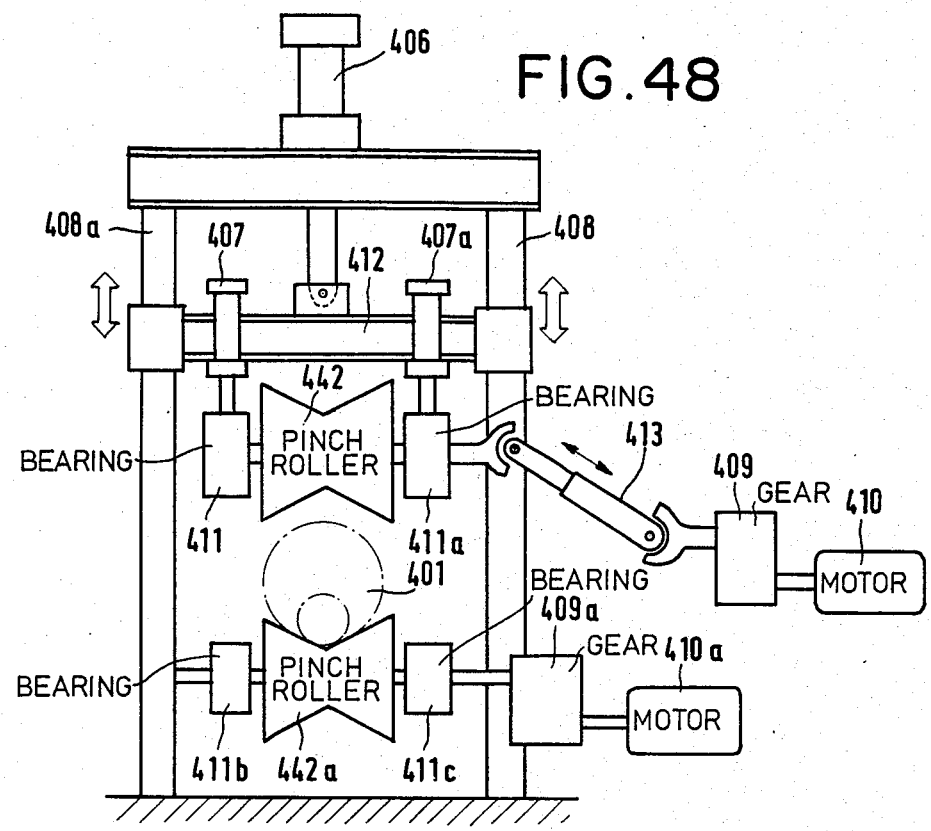
FIG. 48 is a front view of an alternative of a pinch roller stand of FIG. 47.

FIG. 48 is a front view showing an alternative of the pinch roller stand. It comprises hydraulic servocylinders 407 and 407a, posts 408 and 408a, gear boxes 409 and 409a, motors 410 and 410a, bearings 411, 411a, 411b and 411c for the pinch rollers 442 and 442a, a crossbeam 412, and a flexible power transmission 413. The crossbeam 412 is slidably joined to the posts 408 and 408a, so as to be movable vertically, and is driven by the hydraulic cylinder 406. The pneumatic cylinders 407 and 407a are mounted on the crossbeam 412. The lower ends of pistons of pneumatic cylinders 407 and 407a are joined with casings of bearings 411 and 411a of the upper pinch roller 442. The shaft of pinch roller 442 is coupled through the flexible transmission 413 and the gear box 409 to the motor 410. The shaft of the lower pinch roller 442a is coupled through the gear box 409a to the motor 410a.

Thus, the upper pinch roller 442 can shift its position vertically, with a motion of the hydraulic cylinder 406 transmitted to it through the pneumatic cylinders 407 and 407a, so as to press the surface of the tube 401 with a certain force in conjunction with the lower pinch roller 442a. Such a mechanism of two-step transmission of vertical motion, given by the use of above hydraulic and pneumatic cylinders 496, 407 and 407a provides for finer and more effective adjustment of a pressure applied to the surface of the tube 401, as compared with another mechanism of a singlestep transmission. The upper roller 442 rotates when the upper motor 410 is energized, and the lower roller 442a rotates when the lower motor 410a is energized.

The pressing force of the pinch rollers 442 and 442a to the tube surface is to be finely adjustable with accuracy, since the tube 401 may have a high-temperature having just been hot-rolled, and may have not yet secured with the oroinary physical properties which it has at the normal temperature. That is, an excessively large pressing force may result in an unallowable amount of deformation in the section of the tube being pinched, while too small a pressing force may be insufficient to steady the tube in position i.e. may result in a possible radial deflection of the tube. Table VI is a result of experiments wherein the magnitude of the pressing force was varied within certain ranges. These experiments have indicated that the optimum pressing force is within the range of approximately 220 kg to 300 kg.

TABLE V. I

| Outer diam. (mm) | Wall thickness (mm) | Range of pressing force (kg) |
| --- | --- | --- |
| 177.8 | 9.19 | 210–280 |
| 244.5 | 10.03 | 210–290 |
| 273.0 | 11.43 | 220–310 |
| 339.7 | 13.06 | 240–340 |

By operation of the air cylinders 407 and 407a, the upper roller 442 in FIG. 48 applies a pressing force within a range between 220 kg and 300 kg regularly to the tube, to thereby keep it in position.

The mechanisms to drive the upper roller 442 and the lower roller 442a are intended to avoid causing flaws on the tube surface. Such flaws may occur if the roller 442 and 442a serve to pinch the tube. To minimize pinching, the motors 410 and 410a operate synchronously.

In FIG. 46, the tubular product 401 is fed in its longitudinal direction from a mill, (not shown) for example. The product 401 is guided to the wall thickness measuring device 403 by pinch roller stands 405a and 405. The roller stands are positioned so as to lead the tubular product to a predetermined position in the measuring device 403. Roller stands 404a and 404 steady the tube 401 after it passes through the measuring device 403.

Preferably, the equipment of FIG. 46 is provided with a photoelectrical sensor or the like (not shown) to detect when the leading end of the tubular product 401 approaches the measuring device 403. In response to an indication from the sensor, a control means initiates the driving of the hydraulic and pneumatic cylinders so as to generate the pressing force of the pinch roll to the tube surface. Another photoelectrical sensor is preferably placed to detect when the trailing end of the tubular product 401 has run past the measuring device 403. In response to an output of this sensor, the control means removes that pressing force.

The values of the outer diameter of the tube to be measured may range widely, for example from 177.8 mm to 406.4 mm, but can be given before the measurement in the equipment. The position of the hydraulic cylinder 406 in FIG. 48 can be therefore set beforehand for a particular tube size, e.g., to have the upper roller 442 positioned from the upper side of the tube 401 at a certain predetermined initial distance, for example, 50 mm. By providing a certain predetermined initial valve, the lapse of time for obtaining the proper position adjusting motion after the product approaches the measuring device, can be minimized, in every tube size.

A quantitative example of the effect of this embodiment in minimizing the radial deflection of a tube being measured will be given below.

In this embodiment, a radial deflection of the tube or a centering error in the measuring position of the tube is caused from several factors. The first factor is a bend of the tube axis, which is usually less than ±0.5 mm per 1 m of longitudinal distance. So, the first factor can be deemed to correspond to a first error $E_1 \leq 0.5$ mm, subject to an appropriate roller stand arrangement. A second factor is a positioning error on mounting pinch rollers, which through experience, if found to be less than ±0.1 mm, (i.e. $E_2 = \pm 0.1$ mm). A third factor is due to a deflection of a center of a pinch roller surface and a gap in a bearing, which is normally ±0.1 mm, (i.e. $E_3 = 0.1$ mm). A fourth factor is due to an irregularity in the shape of the pinch roller contour, i.e. an error in an angle of taper therein which is within 0.1° in angle. This fourth error factor $E_4 = \pm 0.0017$, since tan $0.1° = 0.0017$. A fifth factor is due to thermal expansion and contraction of the frame of a pinch roller, which may occur where the equipment is being used in a hot process, where heat is radiated from the hot surface of a tube running through it. Assuming a heat expansion coefficient of $0.116 \times 10^{-14}$, a frame temperature variation of 60° C. and a frame width of 300 mm, the fifth error factor can be determind by multiplying them together, giving $E_5 = 0.116 \times 10^{-14} \times 60 \times 300 = 0.208$ mm.

In all, the radial tube deflection in a pinch roller stand $E_o$ can be represented by a root-mean-square of the first through fifth errors, i.e.

$$E_o = \pm \sqrt{E_1^2 + E_2^2 + E_3^2 + 4^2 E_5^2}.$$

Substituting the apropriate values, the value $E_o$ is determined to be $= \pm 0.56$ mm. However, the pinch roller stands are placed at both front and back sides of the measuring device. So, the radial deflection of a tube in the measuring device, or the centering error E therein, can be given by $$E = \pm \sqrt{2 \times (E_1^2 + E_2^2 + E_3^2 + E_4^2 + E_5^2)} = \pm 0.79 \text{ mm}.$$

Where an accuracy of 0.1 mm is required for a measured wall thickness, the corresponding allowable maximum radial deflection of a tube is about ±1.0 mm, which will be seen from FIG. 3. Thus, the above described embodiment provides an effective means for minimizing the radial deflection of a tube, so that measuring can be facilitated with adequate accuracy.

Figure 49:
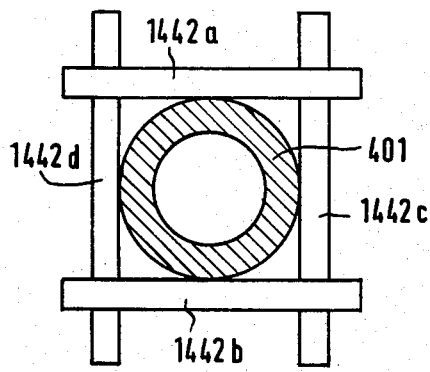
FIGS. 49 and 50 show a modification of shape and arrangement of a pinch roller shown in one or both of FIGS. 47 and 48.
Figure 50:
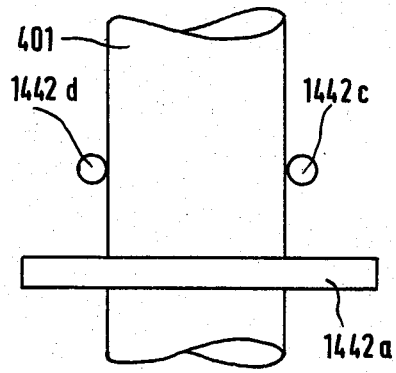

The pinch roller, can have other various alternative shapes. Also, as shown in the front view of FIG. 49 and in the plan view of FIG. 50, two pairs of usual flat rollers 1442a through 1442d may be used as well. One pair of them will serve to steady the tubular object 401 vertically, while the other pair will steady the object horizontally. In this case, each roller will require a driving mechanism.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

We claim:

1. Apparatus for measuring the thickness of a tube wall while said tube experiences substantially continuous axial motion relative to said apparatus comprising:
   beam generation means for generating at least one radiation beam having a known intensity value, said beam having a unique directional radiation path;
   radiation beam moving means for rotating the beam generation means around the axis of a tube to be measured substantially continuously so that said beam sequentially passes along at least three different selected beam paths, each beam path passing through at least two distinct measuring point regions within the cross-section of said tube wall during rotation thereof, and wherein at least three measuring point regions are passed through by at least three different radiation beam paths;
   beam intensity detection means for detecting the intensity of said beam during substantially continuous rotational movement of the beam generation means around the tube's axis and when the beam passes through the measuring point regions within said tube wall, and for producing a detected value of beam intensity for each of said beam paths; and
   processing means for determining said tube wall thicknesses at the measuring point regions from said known intensity value and said detected values of beam intensity.

2. The apparatus as set forth in claim 1 further including:
   means for moving the tube and the apparatus generally in the direction of the tube axis;
   and wherein the radiation beam positioning means positions the beam paths at different positions along the direction of the tube axis;
   and wherein the apparatus further includes delay circuits for receiving the detected values of beam intensity at each position and for providing said detected values of said beam intensity to said processing means after a time period determined by the speed of relative motion of the tube with respect to the tube axis.

3. The apparatus as set forth in claim 1 wherein the processing means integrates the detected values of beam intensity received by said processing means for a predetermined time span.

4. A method of measuring the thickness of a tube wall comprising the steps of:
   generating a radiation beam having a known intensity value and unique directional radiation path;
   defining a set of at least three distinct measuring point regions located in the cross-sectional area of the tube;
   moving the path of said radiation beam substantially continuously through pairs of said measuring point regions, so that each beam intersects the tube wall at an oblique angle;

detecting the intensity of said beam at each beam path position after the beam passes through its pairs of measuring points and tube wall and during substantial continuous movement of the beam relative to the tube and producing a detected value indicative of each beam intensity; and determining the oblique tube wall thicknesses at the measuring point regions by processing said known intensity value and said detected values.

5. The method as set forth in claim 4 further including the step of:

determining the tube wall thicknesses in the radial direction from the values of tube wall thicknesses in the oblique direction.

6. The method as set forth in claim 4 or 5 further including the step of:

determining the diameter of the tube; and wherein the step of determining the oblique tube wall thickness uses the value of the diameter of the tube to determine the tube wall thickness in the oblique direction.

7. In an apparatus for tube wall thickness measurement, which has at least one radiation beam transmitted across a tube in more than two directions such that each of at least three pairs of at least three measuring points arranged within the tube wall is passed by a single radiation beam, and which detects the intensities of the radiation beam or beams after having passed through the pairing measuring points, and which further processes the detected values to determine the wall thickness, the improvement comprising means for preventing radial deflections of a tube during measuring, comprising:

a plurality of pair of V-shaped rollers;

pressing means for pressing the rollers to the tube being measured;

control means for regulating the pressing force that the pressing means exerts on said tube, so that the tube is held firmly, but so that the tube is not pressed with excessive force, thereby minimizing deformity to the tube.

8. The apparatus as set forth in claim 7 further including means for driving the rollers to run the tube in its longitudinal direction.

9. The apparatus as set forth in claim 7 wherein at least one roller pair is oriented to press and hold the tube in the vertical direction, and at least another roller pair is oriented to press and hold the tube in the horizontal direction.

10. The apparatus as set forth in claim 7 wherein the control means comprises means for regulating the pressing force to a value between about 220 kg and 300 kg.

11. The apparatus as set forth in claim 7 wherein the control means comprises a combination of hydraulic and pneumatic cylinders.

12. The apparatus as set forth in claim 7 further including means for detecting when a tube is in the vicinity of said radiation beam, and wherein said pressing means are responsive to said detecting means.

13. Apparatus for measuring the thickness of a tube wall comprising:

beam generation means for generating at least two radiation beams having known intensity values, said beams intersecting at one intersection point and each having a unique directional radiation path;

radiation beam moving means for rotating the beam generation means around the axis of a tube to be measured so that said each beam passes along at least two different selected beam paths, each beam path passing through two distinct measuring points within the cross-section of the tube wall, and wherein the intersection point coincides substantially with a measuring point, and wherein at least three measuring points are passed through by at least three different radiation beam paths;

beam intensity detection means for detecting the intensity of said beams after the beams pass through the respective measuring points within said tube wall, and for producing a detected value of beam intensity for each of said beam paths; and processing means for determining said tube wall thicknesses at the measuring points from said known intensity values and said detected values of beam intensity.

14. The apparatus as set forth in claim 13 wherein the radiation beam moving means rotates the beam generation means to at least four positions and so that at least three measuring points are passed through by at least three different radiation beam paths.

15. Apparatus for measuring the thickness of a tube wall comprising:

radiation beam generation means for generating at least one radiation beam having a known intensity value, said radiation beam having a unique directional radiation path;

radiation beam moving and locating means for moving and locating the radiation beam generation means relative to said tube so that said radiation beam passes along at least three different selected beam paths, each beam path passing through at least two distinct measuring points within the cross-section of the tube wall, wherein at least three measuring points are passed through by at least three radiation beam paths, said radiation beam moving and locating means including means for generating a light beam having an orientation fixed relative to said radiation beam so that when said light beam is substantially tangent to said tube, and at one of a plurality of selected angular rotational positions relative to said tube cross-section, the radiation beam is properly located along a selected radiation beam path, and including means for detecting when said light beam is substantially tangent to said tube;

beam intensity detection means for detecting the intensity of said radiation beams after they pass through the respective measuring points, and for producing a detected value of beam intensity for each of said beam paths; and processing means for determining said tube wall thicknesses at the measuring points from said known intensity value and said detected values of beam intensity.

16. The apparatus according to claim 15 wherein said radiation beam moving and locating means comprises a frame mechanism having mounted thereon said radiation beam generation means and beam intensity detection means, and a light beam generation means and light detector means, and including means for rotating the frame mechanism around said tube, and for moving the frame radially outwardly from said tube when said light detector means does not detect light from said light beam generation means, and for stopping radial movement relative to said tube when said light detector means detects light from said light beam generation means.

* * * * *